Jan. 26, 1960 J. E. WHITFIELD 2,922,377
MULTIPLE ARC GENERATED ROTORS HAVING DIAGONALLY
DIRECTED FLUID DISCHARGE FLOW
Filed Sept. 26, 1957 16 Sheets—Sheet 1
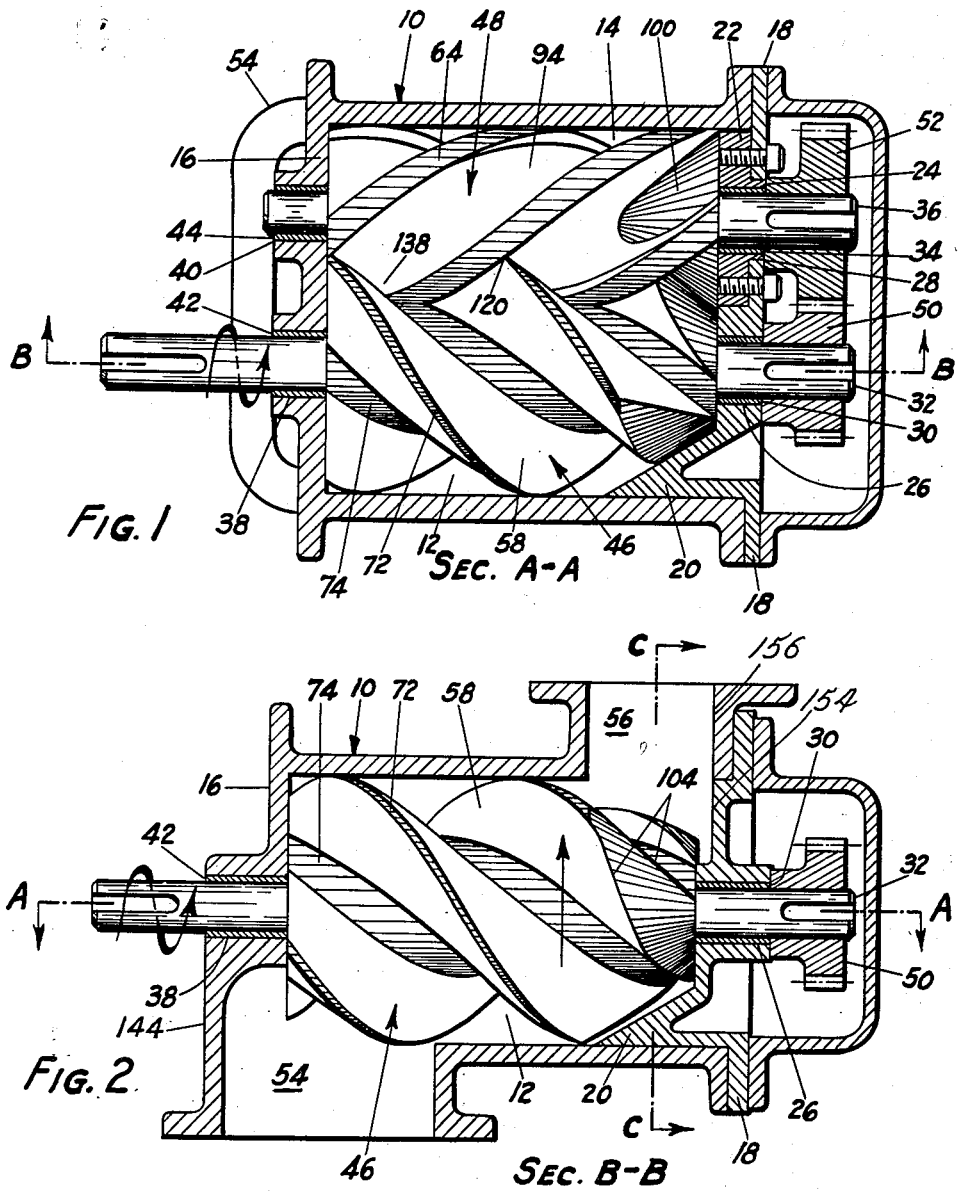
INVENTOR.
JOSEPH E. WHITFIELD
BY
ATTORNEY Jan. 26, 1960  J. E. WHITFIELD  2,922,377
MULTIPLE ARC GENERATED ROTORS HAVING DIAGONALLY
DIRECTED FLUID DISCHARGE FLOW
Filed Sept. 26, 1957  16 Sheets-Sheet 2

INVENTOR.
JOSEPH E. WHITFIELD
BY
ATTORNEY

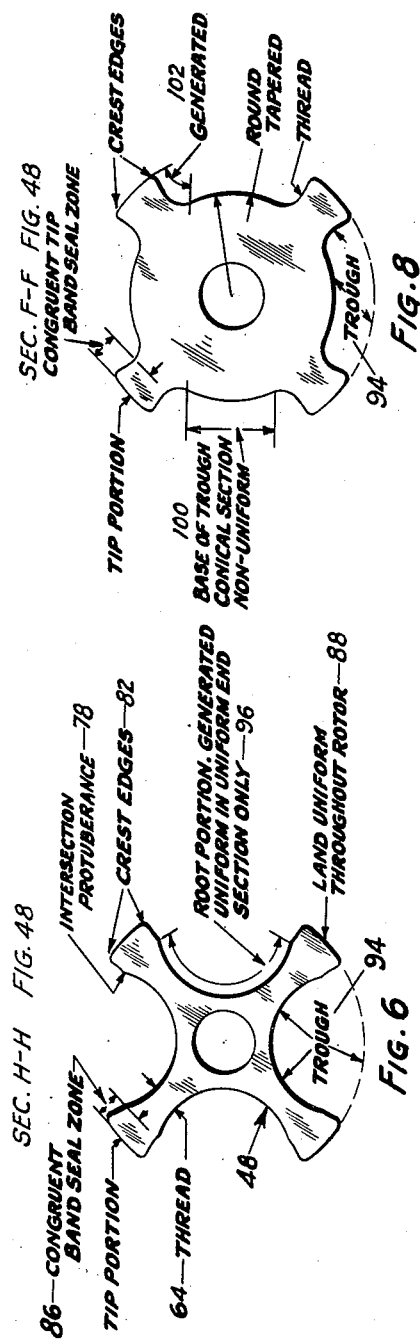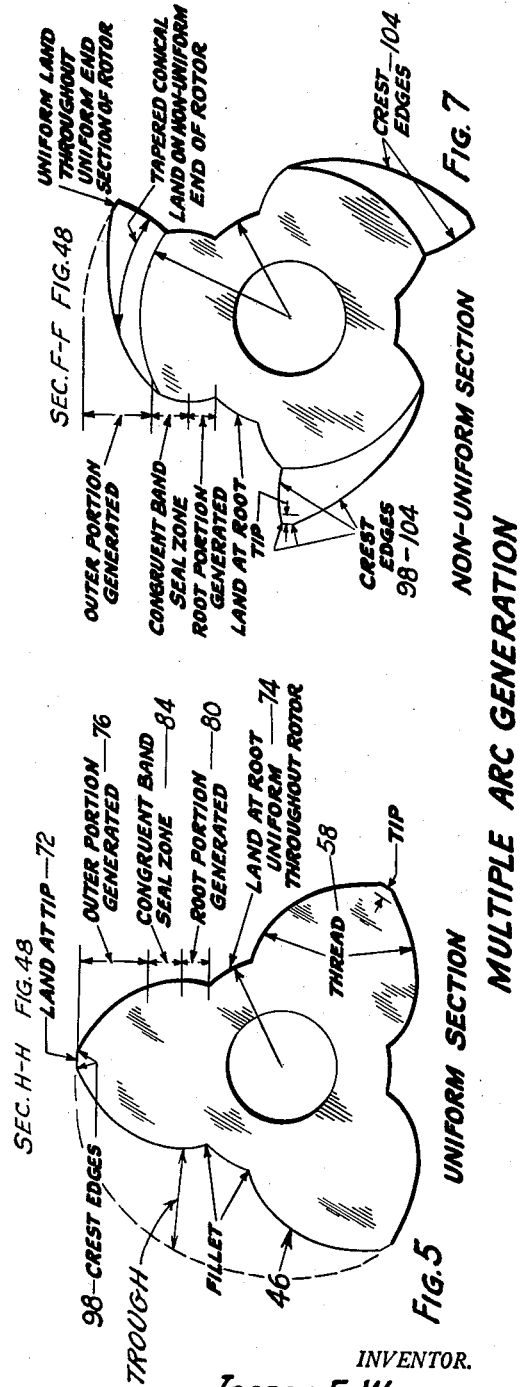

Jan. 26, 1960 J. E. WHITFIELD 2,922,377
MULTIPLE ARC GENERATED ROTORS HAVING DIAGONALLY
DIRECTED FLUID DISCHARGE FLOW
Filed Sept. 26, 1957 16 Sheets-Sheet 4
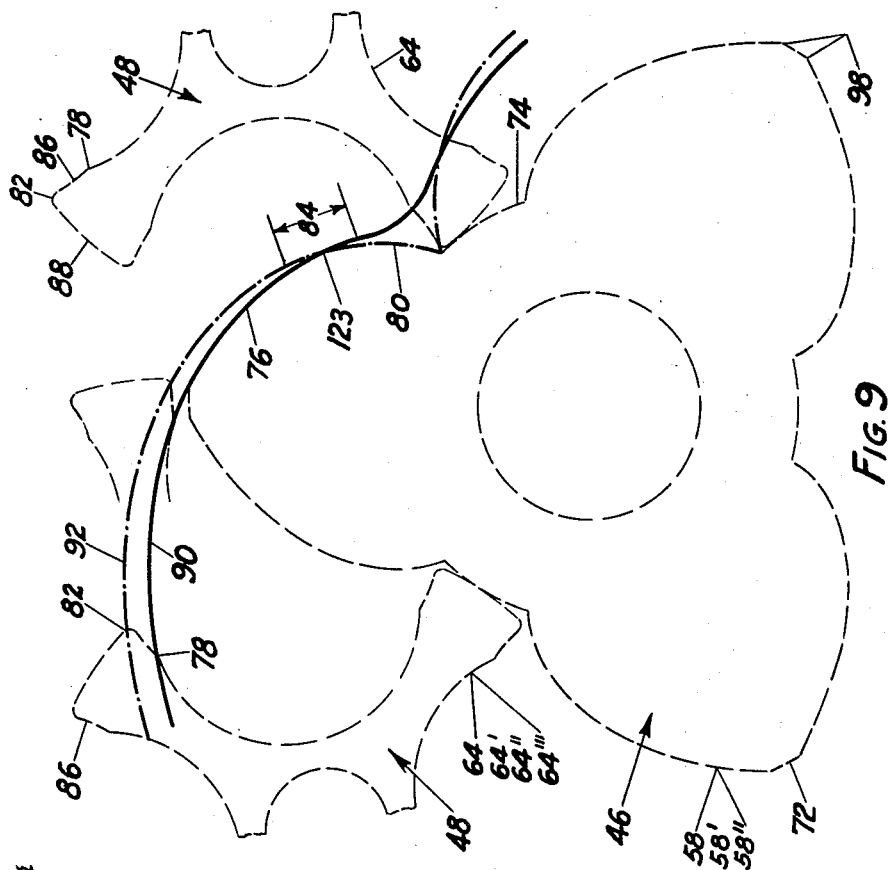
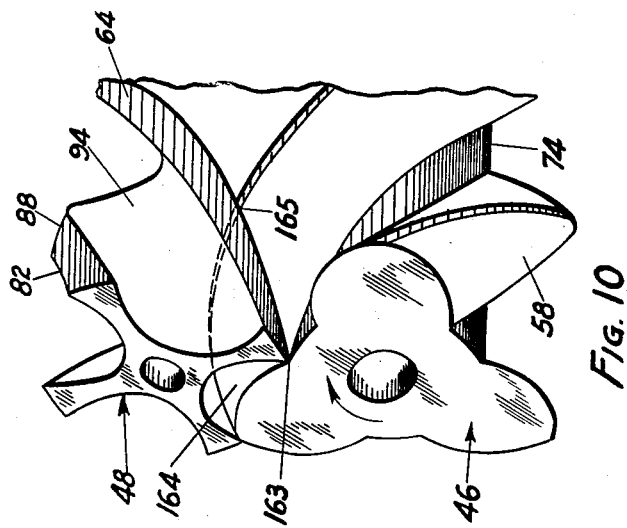
INVENTOR.
JOSEPH E. WHITFIELD
BY
ATTORNEY

INVENTOR.
JOSEPH E. WHITFIELD
BY
ATTORNEY

Jan. 26, 1960 J. E. WHITFIELD 2,922,377
MULTIPLE ARC GENERATED ROTORS HAVING DIAGONALLY
DIRECTED FLUID DISCHARGE FLOW
Filed Sept. 26, 1957 16 Sheets-Sheet 6
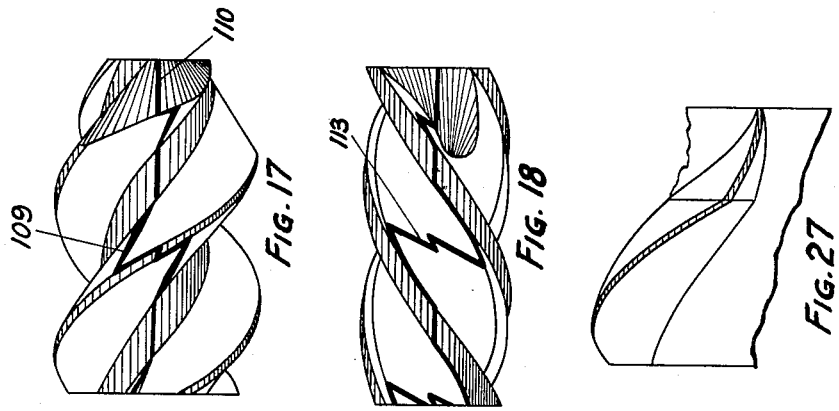
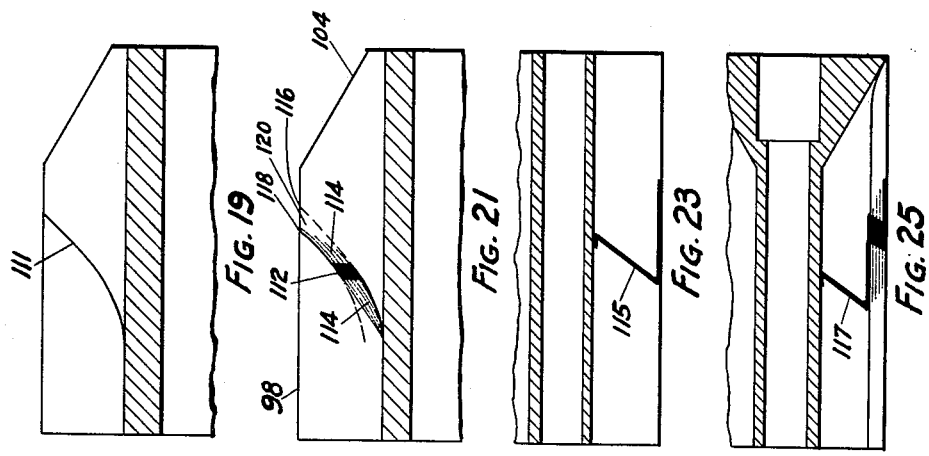
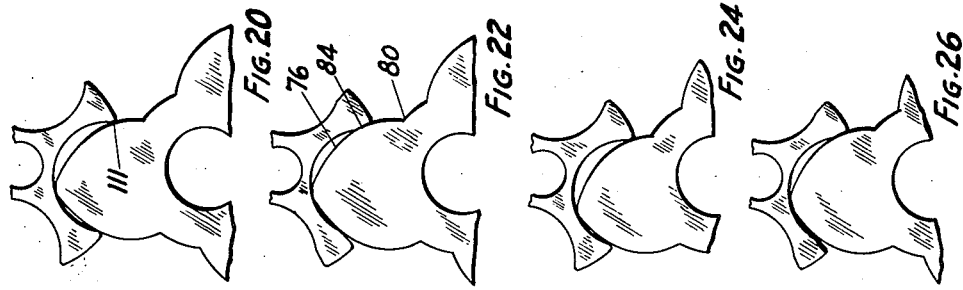
INVENTOR.
JOSEPH E. WHITFIELD
BY
ATTORNEY

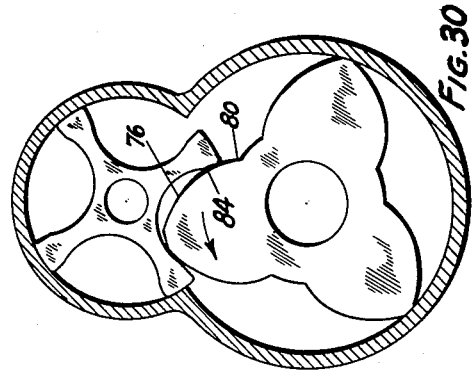
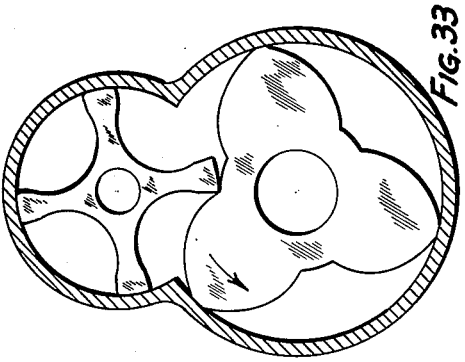
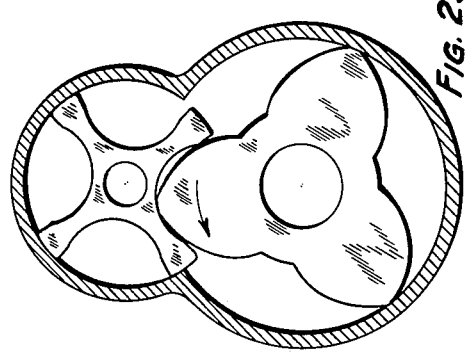
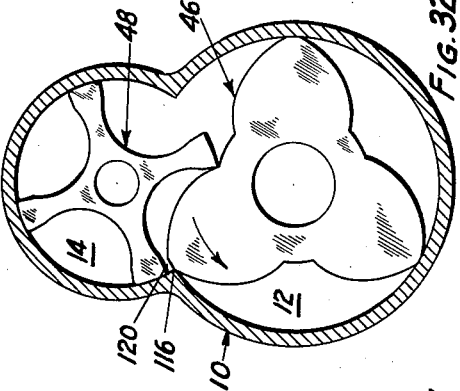
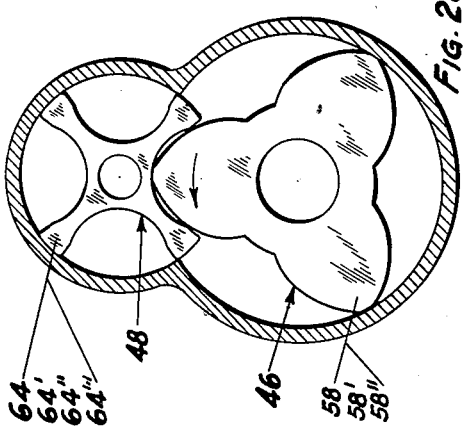
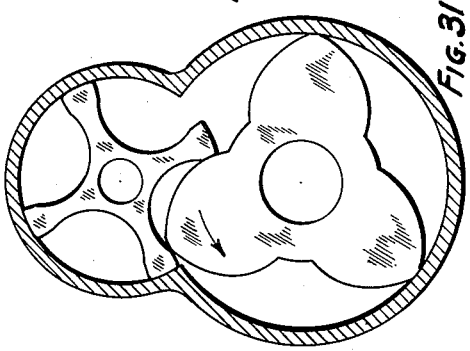

Jan. 26, 1960   J. E. WHITFIELD   2,922,377
MULTIPLE ARC GENERATED ROTORS HAVING DIAGONALLY
DIRECTED FLUID DISCHARGE FLOW
Filed Sept. 26, 1957   16 Sheets-Sheet 8
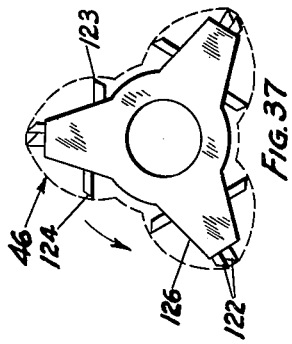
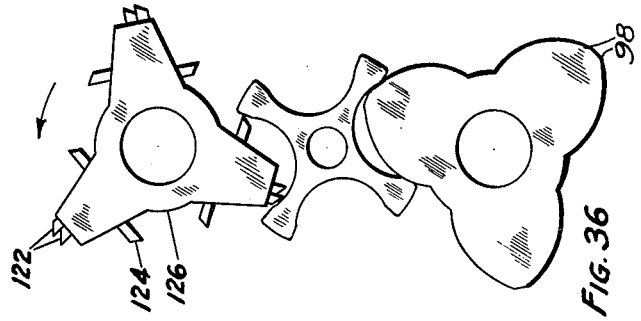
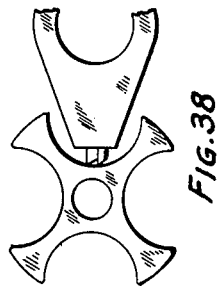
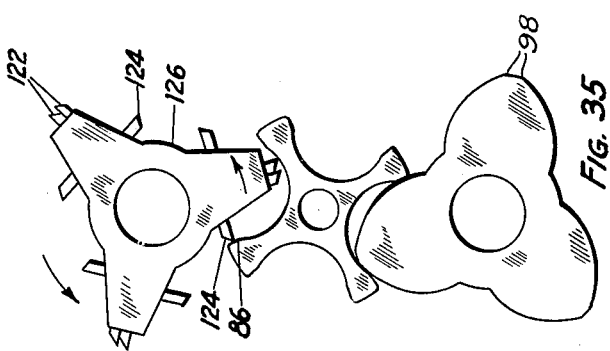
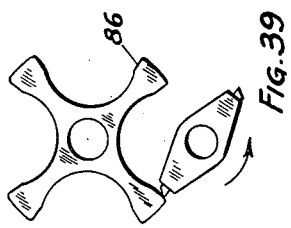
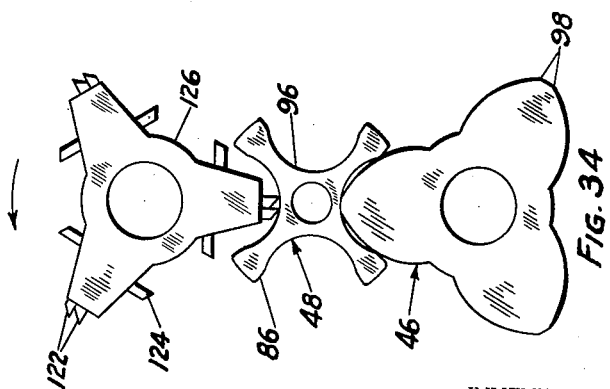
INVENTOR.
JOSEPH E. WHITFIELD
BY
ATTORNEY

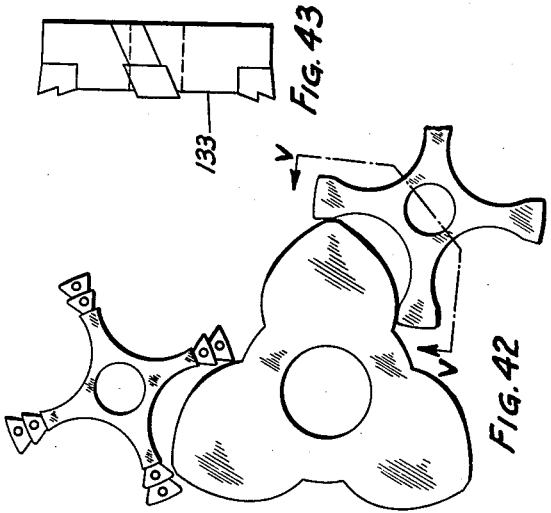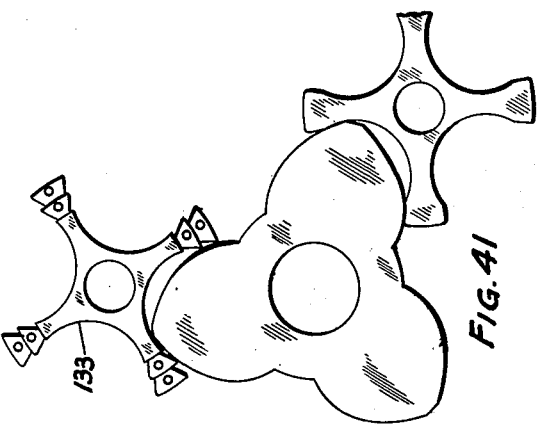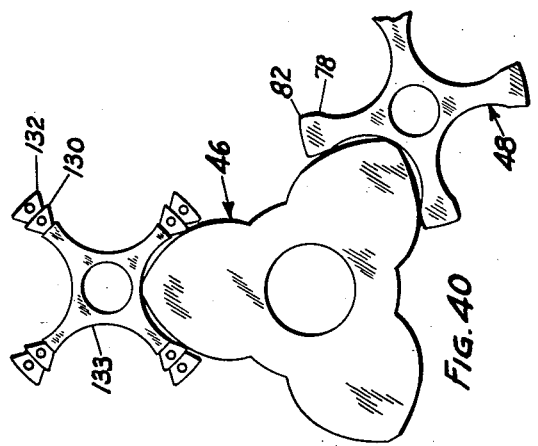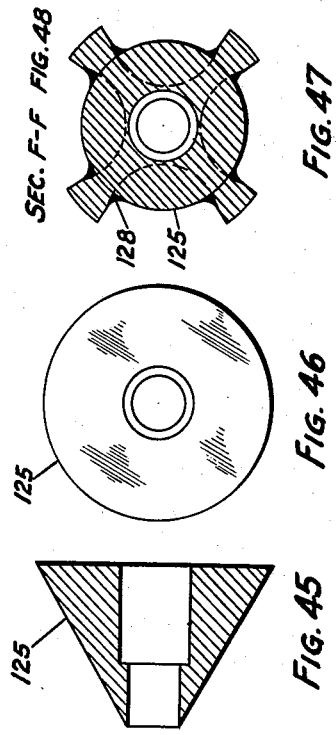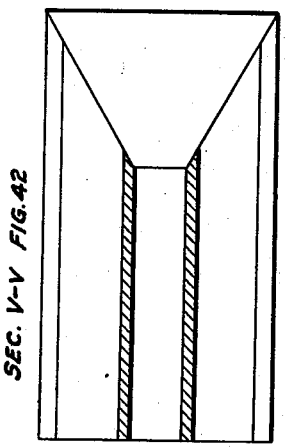

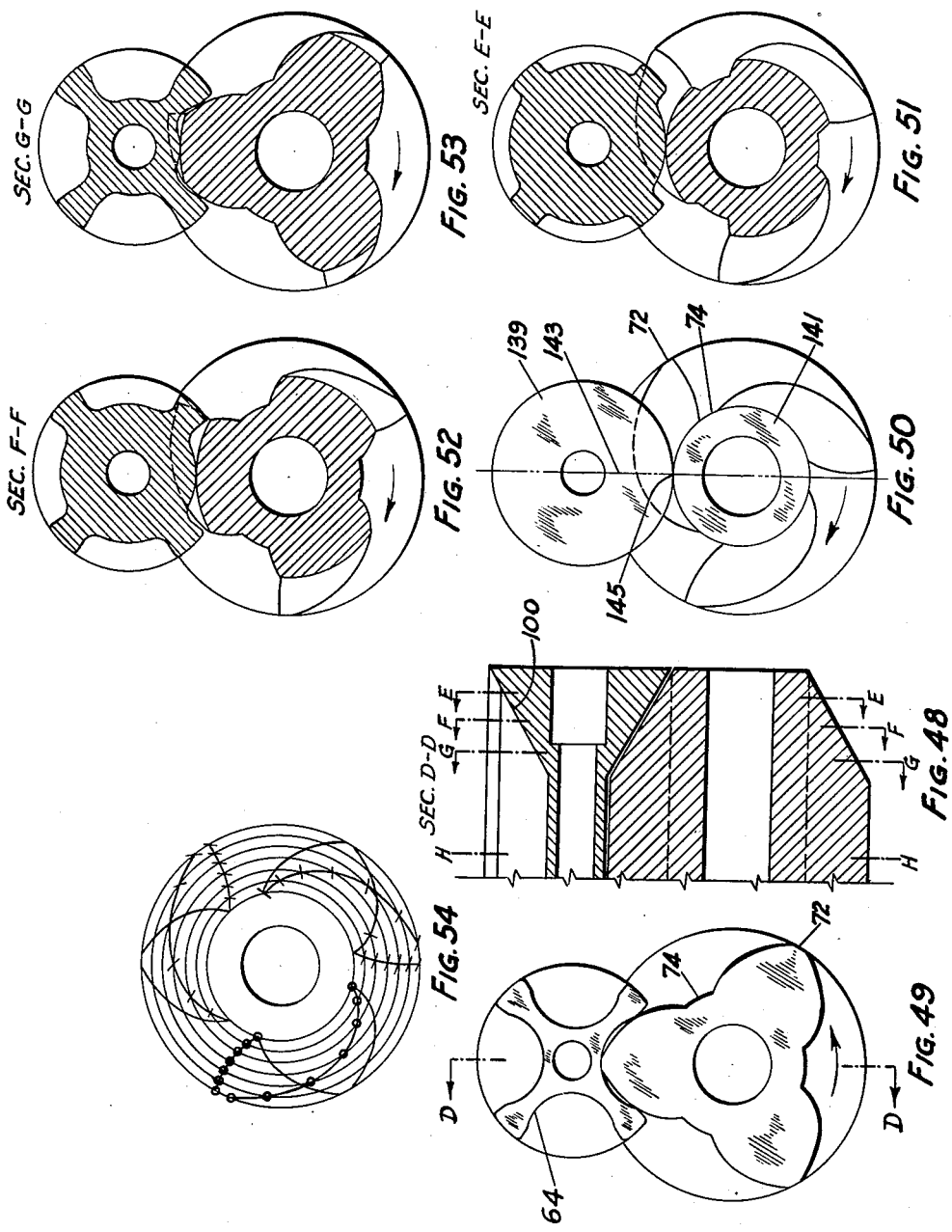

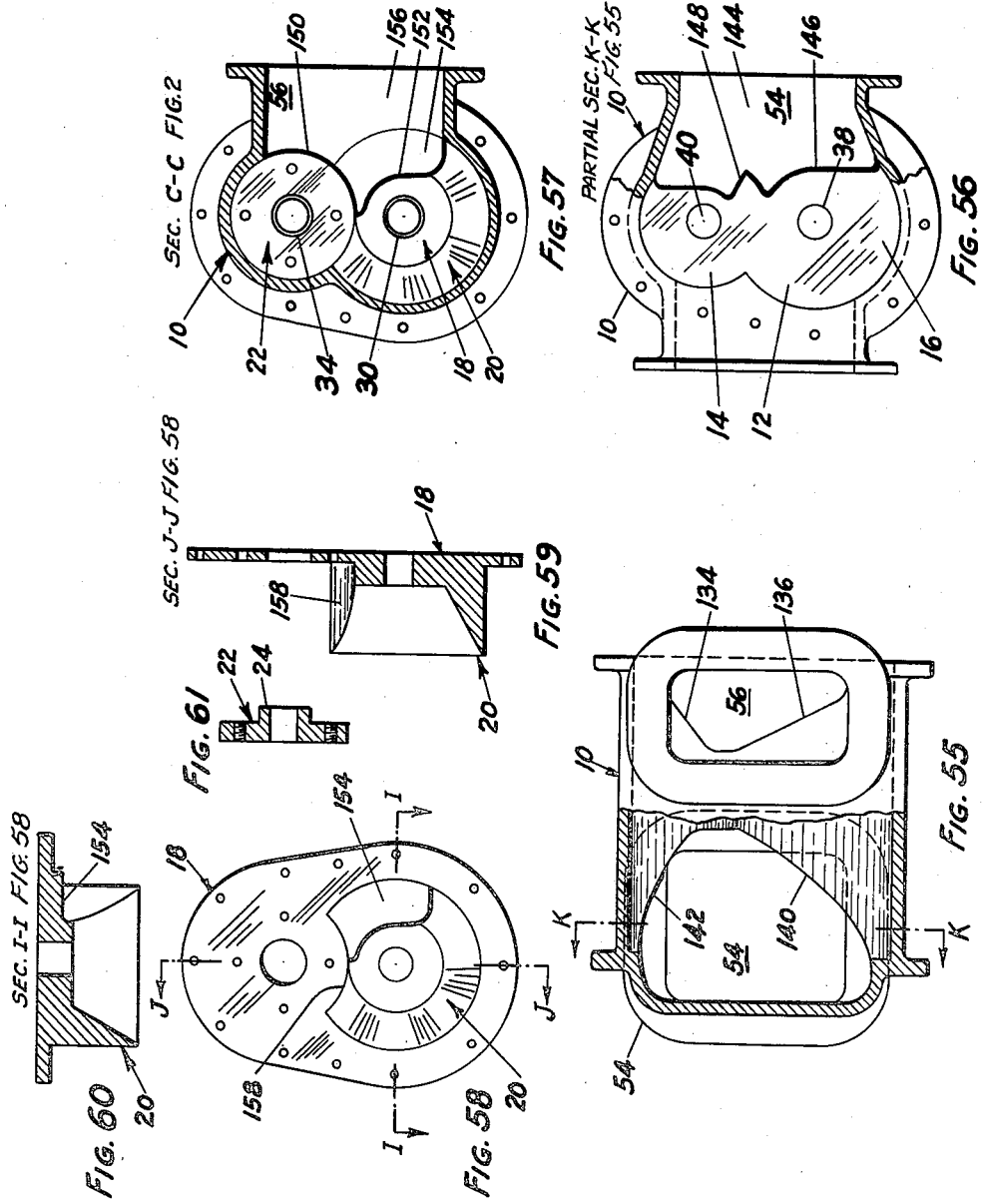

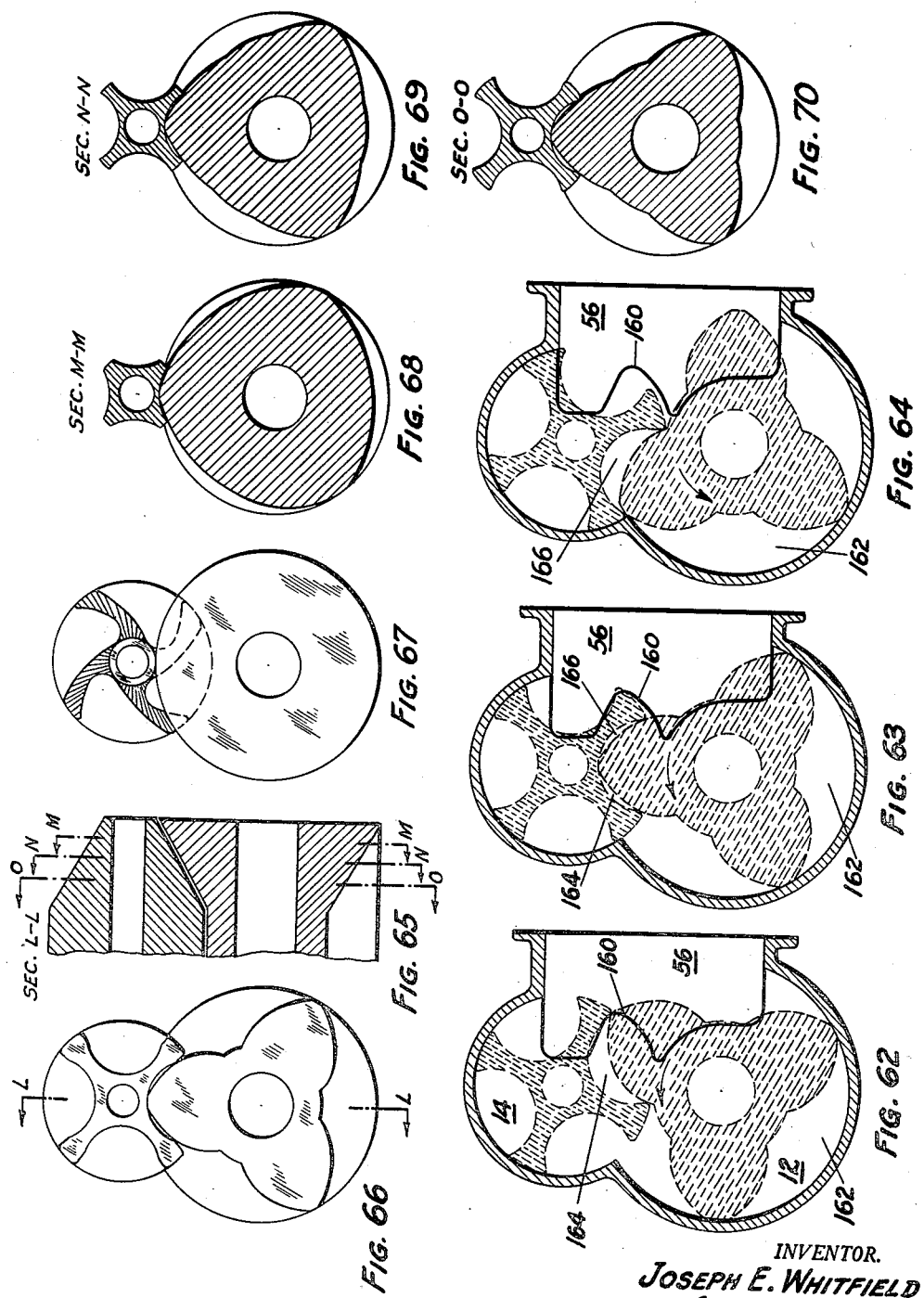

Jan. 26, 1960 J. E. WHITFIELD 2,922,377
MULTIPLE ARC GENERATED ROTORS HAVING DIAGONALLY
DIRECTED FLUID DISCHARGE FLOW
Filed Sept. 26, 1957 16 Sheets-Sheet 13
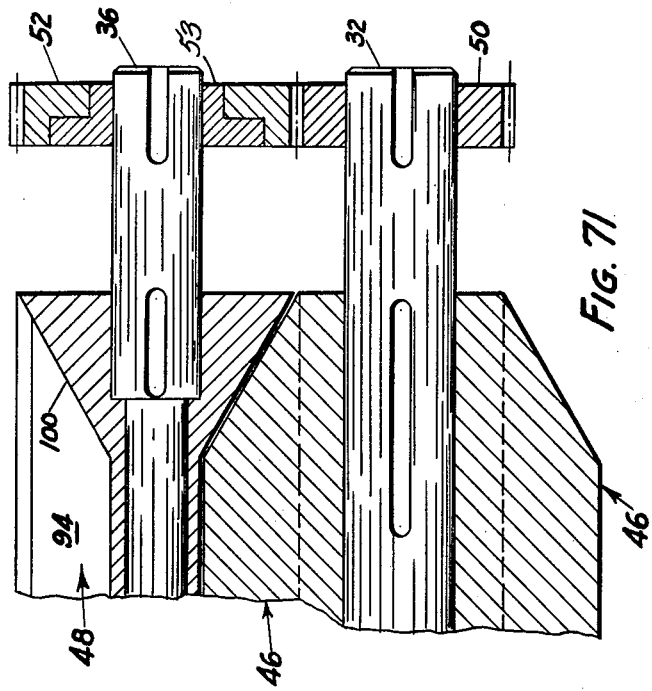
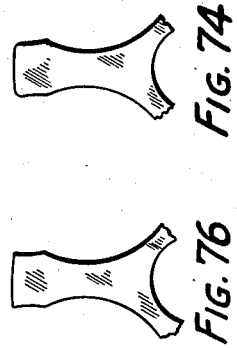
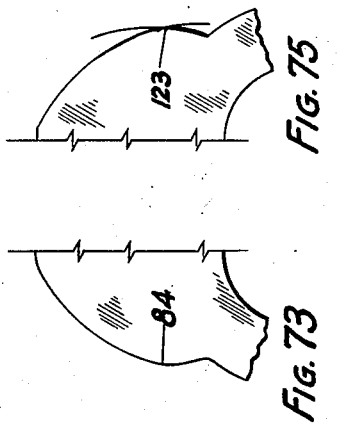
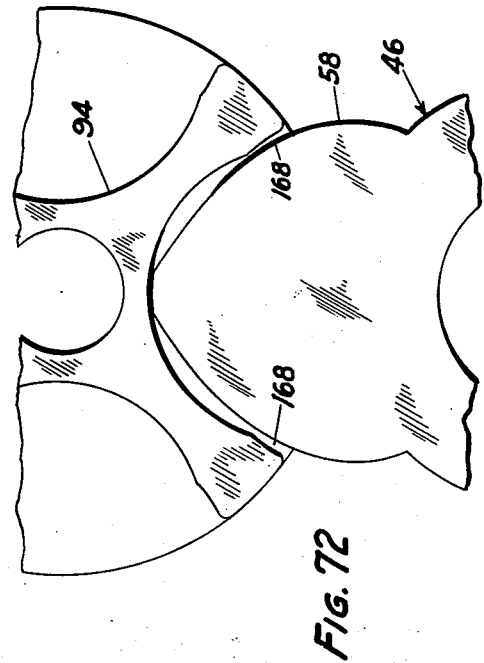
INVENTOR.
JOSEPH E. WHITFIELD
BY
ATTORNEY Jan. 26, 1960 J. E. WHITFIELD 2,922,377
MULTIPLE ARC GENERATED ROTORS HAVING DIAGONALLY
DIRECTED FLUID DISCHARGE FLOW
Filed Sept. 26, 1957 16 Sheets-Sheet 14

INVENTOR.
JOSEPH E. WHITFIELD
BY
ATTORNEY

Jan. 26, 1960 J. E. WHITFIELD 2,922,377
MULTIPLE ARC GENERATED ROTORS HAVING DIAGONALLY
DIRECTED FLUID DISCHARGE FLOW
Filed Sept. 26, 1957 16 Sheets-Sheet 15
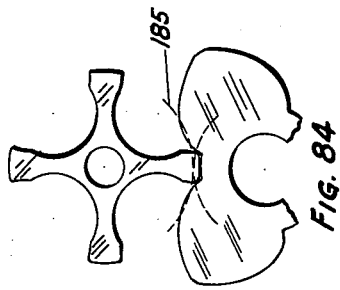
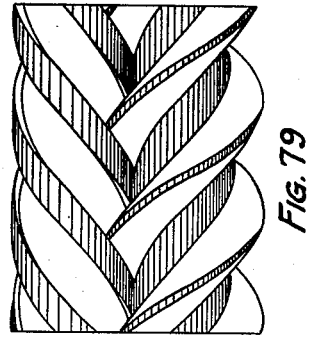
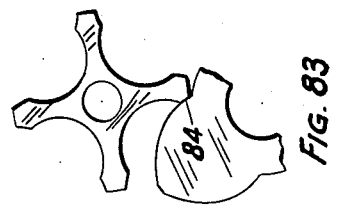
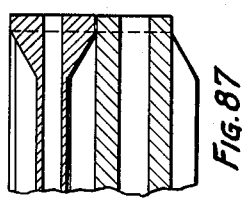
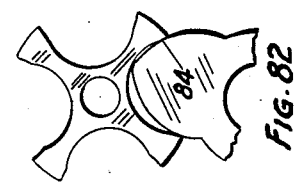
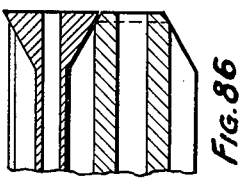
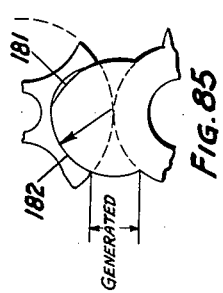
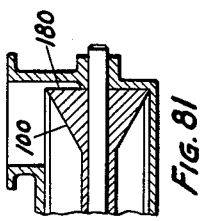
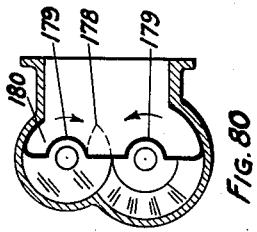
INVENTOR.
JOSEPH E. WHITFIELD
BY
ATTORNEY

United States Patent Office 2,922,377
Patented Jan. 26, 1960

2,922,377

MULTIPLE ARC GENERATED ROTORS HAVING DIAGONALLY DIRECTED FLUID DISCHARGE FLOW

Joseph E. Whitfield, York, Pa.

Application September 26, 1957, Serial No. 686,353

12 Claims. (Cl. 103—128)

This invention relates generally to fluid pumps, motors, compressors, blowers, meters and similar devices in which interengaging rotary members are provided with helical intermeshing threads and, more particularly, to the novel features of the rotary members, the housing in which they operate and other associated parts embodied with any one of these devices.

Screw-type fluid motors, blowers and the like have two or more helically threaded members rotatably supported with their axes parallel, for example, and with their complementary threads intermeshing to provide a continuous seal line the full length of the rotors. The housing encloses both of the rotary members and the perimetric tip of each thread forms a seal therewith. Thus any flow of fluid from one end of the members must pass through the spaces enclosed by the threads on the rotary members in cooperation with the housing.

The threads must be complementary to form satisfactory seals and spaces and permit rotation of the members. Thus one rotary member has right-hand threads while the mating rotary member has left-hand threads.

While more than two rotary members can be used, only two will be shown and described herein for purposes of simplicity. The threads on one of the rotors usually lie wholly outside the pitch circle and do most of the work of compression; this rotor is termed the main rotor. The threads on the other rotor usually lie wholly within the pitch circle and form a valve or gate across the path of the main rotor; this rotor is termed a gate rotor. Also the main rotor is sometimes called the male rotor and the gate rotor is sometimes called the female rotor but it is preferred to designate them as main and gate rotors.

When rotated, the main rotor threads, in effect, act as a continuous series of pistons which slide endwise through the troughs between the threads of the gate rotor and produce a continuous series of pockets which convey the fluid from the suction end of the rotors to the discharge end. The opening in the intake end of the housing is termed the suction port and the opening in the outlet end is termed the discharge port. Axial flow screw-type devices of this general construction are usually reversible, and such reversing reverses the ports, but this description discloses a device that is more efficient when operated in one certain direction and, in general, is not reversible.

This general type of device is old and well known in the art and is in use for various purposes. However, heretofore, all such devices have had certain, very serious limitations. For instance, certain thread forms do not produce continuous seals between the rotors and leakage results. Others have low capacity for a given bulk size, while still others have a rotor form in which the threads on one member are not rigid enough for the purpose, and several known thread forms are very difficult to machine accurately. However, the most serious fault with former rotor designs is their formation of sealed pockets at the discharge end which create excessive pressure, temperature and noise. Certain basic advantages of the screw-type devices however are so desirable that they have been accepted, to a considerable degree, despite their known inadequacies.

To produce a more ideal blower of this type, it is necessary that the sealing line between the rotors remain unbroken as the rotors revolve, that the rotors and associated shafts be of rigid design, that the rotors be of such shape that they can be made accurately and economically, that no sealed pockets are formed, and no leakage openings develop as the rotors revolve. All these desirable objects may be accomplished with the new rotors as disclosed herein.

The number of threads on each rotor is generally a matter of choice and depends upon the speed, pressure and other considerations. A larger number of threads is generally chosen for extremely high speed and high internal compression ratio. The other extreme would be two threads on the main rotor and three or four on the gate rotor. Any of these combinations will operate and all will have certain advantages over other combinations. However, it is believed three threads on the main rotor and four threads on the gate rotor provide the best and most universal combination and this disclosure will be directed to such a combination but is not limited thereto.

When accurately formed, complementary threads of the rotor members will operate as smoothly as a set of gears and the main rotor can be used to drive the gate rotor. However, in actual use the rotors usually operate without lubrication on the thread surfaces and also, because of the high speeds at which these devices operate, it is generally advisable to provide timing gears, and rotors with certain fixed clearances, so that the rotors operate in timed relation and do not contact each other or the housing. It has been found that should the rotors contact each other, or the housing, the friction between the parts will produce heat and cause failure. Thus, it is important to have rigid parts that can absorb considerable power without deflecting and making contact with other parts. Furthermore, as the rotors do not make contact with each other or with the housing they are not subject to wear. Thus, this improved device has two fundamental desirable features. The rotors do not require lubrication and are not subject to wear.

The principal object of this invention is to provide rotors having multiple arc generation in combination with directed diagonal discharge air flow.

A second important object of this invention is to eliminate the sealed pockets formed at the discharge end just before the pockets run out.

Another object is to provide wide, unbroken, highly effective sealing lines.

Another object is to provide rotors that form pockets which run out to zero without loss in capacity.

Another object is to provide a device in which both rotors can be effectively cooled by liquid circulated therein.

Another object is to provide a gate rotor having threads that are well supported against deflection.

Another object is to provide a gate rotor that will accommodate a larger shaft than heretofore possible without reducing the capacity of the device.

Another object is to provide the main rotor with a tapered end which is non-uniform in cross-section, and a complementary, tapered re-entrant ring on the housing end wall to form a seal therewith.

Another important object is to provide such a device that is suitable for higher speeds and pressures.

Another object is to provide a blower wherein the discharge pockets run out as they approach the center between the rotors.

Another object is to provide such a device wherein the extreme end of the suction pocket does not become interposed between the discharge pocket and the discharge port.

Other objects and advantages appear in the following description, reference being had to the several embodiments illustrated in the accompanying drawings in which:

Fig. 1 is a longitudinal sectional view taken through the axes of the rotor members on line A—A of Fig. 2.

Fig. 2 is a longitudinal sectional view taken through the axis of the main rotor on line B—B of Fig. 1, at a right angle to the view in Fig. 1, and showing the suction and discharge ports.

Fig. 5 is a sectional view taken on the line H—H of Fig. 48 through the uniform end section of the main rotor and including the nomenclature of the rotor exterior.

Fig. 6 is a sectional view taken on the line H—H of Fig. 48 through the uniform end section of the gate rotor and including the nomenclature of the rotor exterior.

Fig. 7 is a sectional view taken on the line F—F of Fig. 48 through the non-uniform end section of the main rotor and including the nomenclature of the rotor exterior.

Fig. 8 is a sectional view taken on the line F—F of Fig. 48, through the non-uniform end section of the gate rotor and including the nomenclature of the rotor exterior.

Fig. 9 shows the development of the generated thread surfaces on the main rotor by the describing arcs on the gate rotor.

Fig. 10 is a perspective view of a pair of conventional rotors in full mesh showing the formation of the sealed pocket at the discharge end thereof.

Figure 11:
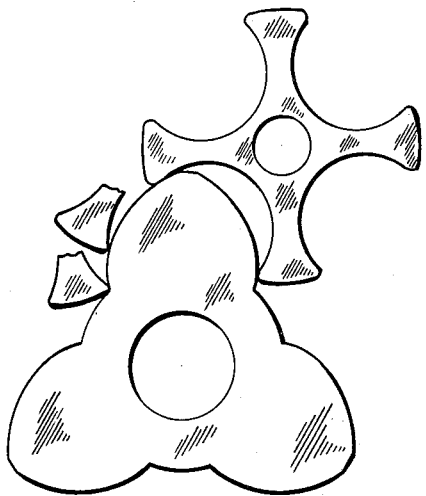

Fig. 11 diagrammatically shows a main rotor being described, or generated, by the crest edge of the gate rotor, providing single arc generation and line sealing in accordance with the invention, a tip of the gate rotor being shown in three different positions relative to the main rotor.

Figure 12:
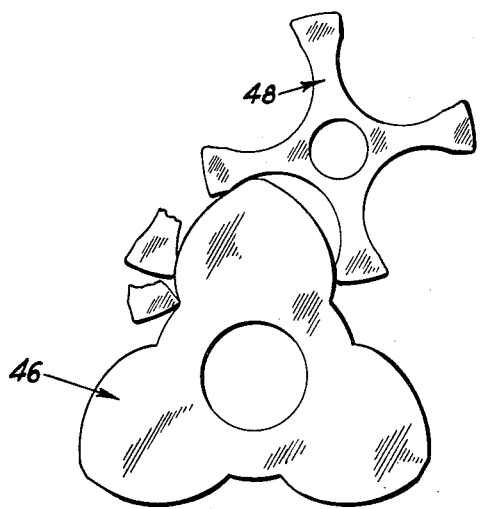

Fig. 12 diagrammatically shows a main rotor being described, or generated, by the crest edge and intersection protuberance of the gate rotor providing multiple arc generation and band sealing in accordance with the invention, a tip of the gate rotor being shown in three different positions relative to the main rotor.

Figure 13:
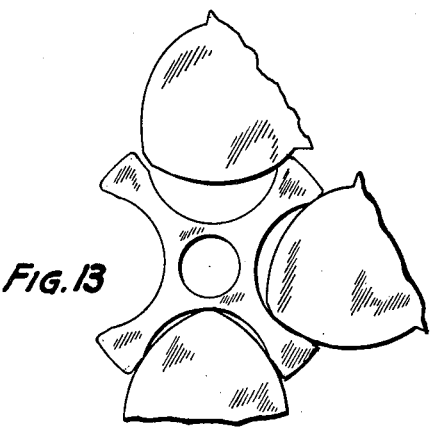

Fig. 13 diagrammatically shows multiple arc generation on the gate rotor by multiple describing arcs on the main rotor, a thread of the main rotor being shown in three different positions relative to different threads of the gate rotor.

Figure 14:
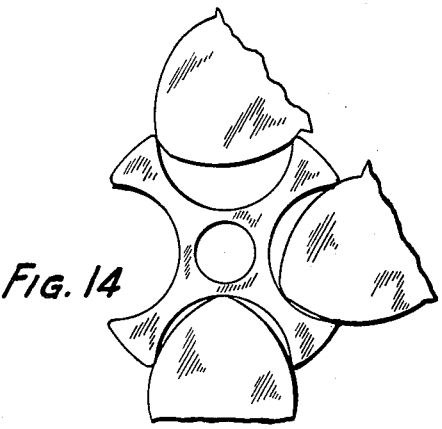

Fig. 14 diagrammatically shows single arc generation on the gate rotor by the crest edge of the main rotor, a thread of the main rotor being shown in three different positions relative to different threads of the gate rotor.

Figure 15:
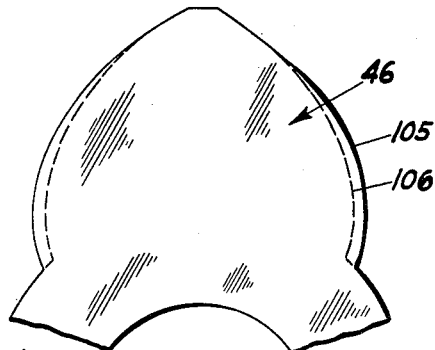

Fig. 15 diagrammatically shows the difference between single and multiple arc generation on a main rotor thread in cross-section.

Figure 16:
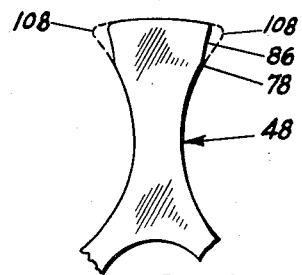

Fig. 16 diagrammatically shows the difference between single and multiple arc generation on a gate rotor thread in cross-section.

Fig. 17 is a side elevation showing the continuous seal line on a main rotor having multiple arc generation.

Fig. 18 is a side elevation showing the complementary seal line on a gate rotor having multiple arc generation.

Fig. 19 is a longitudinal sectional view showing a single arc generation line seal on the side of a main rotor thread, the rotor being shown untwisted for clarity.

Fig. 20 is an end view showing the line seal contact point between the main and gate rotors with single arc generation.

Fig. 21 is a longitudinal sectional view showing a multiple arc generation band seal on the side of a main rotor thread, the rotor being shown untwisted for clarity.

Fig. 22 is an end view showing the band sealing contact between the main and gate rotors with multiple arc generation.

Fig. 23 is a longitudinal sectional view showing a single arc generation line seal on the gate rotor thread, the rotor being shown untwisted for clarity.

Fig. 24 is an end view showing the crest edge of the main rotor producing the line seal on the gate rotor.

Fig. 25 is a longitudinal sectional view showing a multiple arc generation band seal on one side of the gate rotor thread, the rotor being shown untwisted for clarity.

Fig. 26 is an end view showing the area of congruency between the main and gate rotors which produces the band seal line.

Fig. 27 is a fragmentary portion of a main rotor showing the rotor thread on which the non-uniform end is tapered to provide a land at the tip having uniform width throughout the length of the rotor.

Figs. 28 to 33 inclusive are transverse vertical sectional views through a housing and rotors showing rotors having multiple arc generation in various positions of engagement as later described in detail.

Figs. 34 to 36 inclusive are vertical end views respectively showing different corresponding positions of the cutting position of the machining tools and the main rotor relative to the gate rotor, when producing multiple arc generation.

Fig. 37 is an end view showing the position of the cutting tools in relation to the finished main rotor for multiple arc generation of the gate rotor.

Fig. 38 is an end view showing single arc, or single point, generation of the gate rotor.

Fig. 39 is an end view showing an alternative method of machining the congruent tip portion of the gate rotor, this being a separate operation preferably made after the rotor has been generated.

Figs. 40 to 42 inclusive are end views showing respectively different corresponding positions of the machining tools and gate rotor relative to the main rotor when producing multiple arc generation.

Fig. 43 is a side view of the cutting tool holder for forming the main rotor.

Fig. 44 is a longitudinal sectional view showing a machined gate rotor bored out at one end in the form of a taper, the ends of the threads not shown projected in the tapered bore and the rotor being untwisted for clarity, the section being taken on the line V—V of Fig. 42.

Fig. 45 is a longitudinal sectional view of a finished cone ready to be fixedly attached within the tapered bore of the gate rotor.

Fig. 46 is a vertical end view of the cone shown in Fig. 45 as viewed from the largest end.

Fig. 47 is a transverse sectional view showing a section through the non-uniform end section of the gate rotor after the cone shown in Figs. 45–46 is welded in place, the section being taken on the line F—F of Fig. 48.

Fig. 48 is a fragmentary longitudinal sectional view through the non-uniformed end section of the main and gate rotors in meshed position, the rotors having multiple arc generation and shown untwisted for clarity, the section being taken on the line D—D of Fig. 49.

Fig. 49 is an end view of the uniform end section of the rotors.

Fig. 50 is an end view of the non-uniform end section of the rotors.

Figs. 51 to 53 inclusive are sectional views taken through the non-uniformed end section of the rotors as seen respectively on the lines E—E, F—F, and G—G of Fig. 48.

Fig. 54 diagrammatically shows the development of the non-uniform end of the main rotor.

Fig. 55 is a side view of the blower housing partially in section.

Fig. 56 is an end view of the housing, partially in section on the line K—K of Fig. 55, looking into the open end thereof against the integral suction end wall.

Fig. 57 is a sectional view of the housing taken on line C—C of Fig. 2 and looking against the removable end wall thereof.

Fig. 58 is a plan view of the inner face of the discharge end wall and showing the tapered ring section in place.

Fig. 59 is a vertical section of the discharge end wall taken on the line J—J of Fig. 58.

Fig. 60 is a horizontal sectional view of the end wall taken on the line I—I of Fig. 58.

Fig. 61 is a vertical sectional view of the re-entrant centering plate shown detached from the end wall.

Figs. 62 to 64 are vertical sectional views and showing the discharge port outline as used with generated rotors uniform throughout the length thereof, the various positions of the rotors being shown in phantom. In these Figs. 62–64 it is intended to show the rotor positions and not sections of the rotors themselves.

Fig. 65 is a fragmentary longitudinal sectional view on the line L—L of Fig. 66 and showing the non-uniform ends of a pair of alternate rotor forms, the rotors being shown untwisted for clarity.

Fig. 66 is an end view of the opposite or uniform end section of the rotors shown in Fig. 65.

Fig. 67 is an end view of the non-uniform end section of the rotors shown in Fig. 65.

Figs. 68 to 70 are transverse sectional views of the rotors taken respectively on lines M—M, N—N and O—O of Fig. 65.

Fig. 71 is a longitudinal sectional view of the power circuit as applied to blowers.

Fig. 72 is a fragmentary end view of the rotors illustrated with exaggerated clearance between the rotor threads.

Fig. 73 is an end view showing the intersections of the curves on the main rotor threads rounded to provide multiple arc generation on the main rotor and to describe multiple arc generation on the gate rotor as shown in Fig. 74.

Fig. 74 is an end view showing the intersections of the curves on the gate rotor threads rounded to provide multiple arc generation on the gate rotor and describing multiple arc generation on the main rotor as shown in Fig. 73.

Fig. 75 is an end view showing the intersections of the curves on the main rotor thread not rounded and providing multiple point generation on the main rotor and describing multiple point generation on the gate rotor as shown in Fig. 76.

Fig. 76 is an end view showing the intersections of the curves on the gate rotor thread not rounded and providing multiple point generation on the gate rotor and describing multiple point generation on the main rotor shown in Fig. 75.

Figure 77:
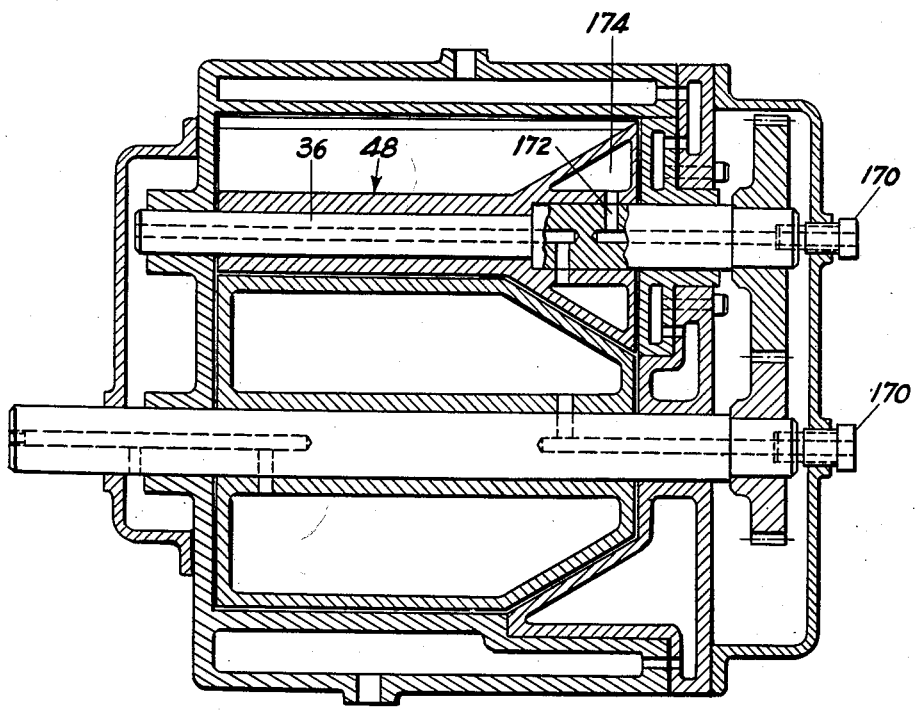
Figure 101:
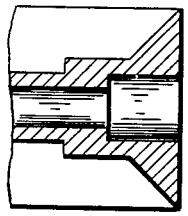
Figure 97:
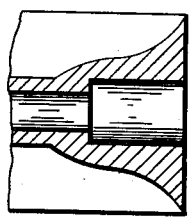

Fig. 77 is a longitudinal sectional view of a blower of which the housing, discharge end wall, and both rotors are arranged to be liquid cooled.

Figure 78:
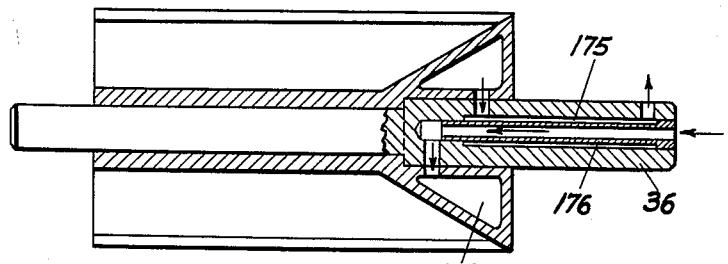

Fig. 78 is a longitudinal sectional view illustrating an alternate method of cooling the rotors.

Fig. 79 is a plan view of a pair of rotors in mesh, the rotors having multiple arc generation and being uniform throughout their length.

Fig. 80 is a transverse sectional view of the housing showing another embodiment of discharge end wall differing from that shown in Fig. 57.

Fig. 81 is a fragmentary longitudinal section of the blower showing a thrust balancing pocket.

Fig. 82 is a fragmentary end view showing the band sealing zone located near the tip of the main rotor thread.

Fig. 83 is a view similar to Fig. 82 but showing the band sealing zone located at the root of the main rotor thread.

Fig. 84 is another view similar to Fig. 82 but showing the gate rotor larger in diameter than its pitch circle.

Fig. 85 is an end view of fragmentary portions of rotors having asymmetrical thread profiles.

Fig. 86 is a fragmentary longitudinal sectional section of the discharge end of the rotors embodying an alternate design of cone on the gate rotor which is larger than the outside diameter of the rotor, the rotors being shown untwisted for clarity.

Fig. 87 is a view similar to Fig. 86 but showing both of the rotors having a short cylindrical end on the non-uniform end of the rotors, the rotors also being shown untwisted for clarity.

Figs. 88 to 101 inclusive are longitudinal sectional views showing alternative forms for the gate rotor, the rotors being shown untwisted for clarity.

In the specification and claims certain terms such as "pockets," "run-out," "timing" and "timing gears" are used and to render the meaning thereof clear, the following definitions are set forth:

*Pockets.*—The spaces or cavities formed by the co-action of the rotor threads in conjunction with the housing chamber walls. These pockets are actually the spaces that are filled with the fluid being pumped. During operation of the device the pockets form continuously at the suction end of the rotors and vanish continuously at the discharge end of the rotors.

*Run-out.*—This term is generally applied in connection with the pockets as they reach the discharge end and decrease in size to zero, or vanish. The pockets form at the suction end and increase to maximum size as the rotors rotate. These pockets continue to fill with the fluid being pumped until they reach maximum size. They are then disconnected from the suction port by the rotor thread action relative to the suction port edges and the pockets then begin to decrease in size and compress the fluid contained therein. Compression continues until the pocket registers with the discharge port and discharge of the fluid takes place. The pocket continues to decrease in size until it completely vanishes, or "runs-out" at the extreme end of the rotors.

*Timing gears.*—Gears used to "time" the rotors and keep them in timed relation to eliminate contact between the threads of the mating rotors when the device is in operation. The clearance between the gear teeth must be less than the clearance between the rotor threads if contact is to be avoided. For example, the clearance, or backlash, between the timing gears usually is within the range of .002″ to .003″, while the clearance between the rotor threads may be within the range of .020″ to .040″, and depends upon the size of the device. Thus the rotor threads can not contact each other as they are held in timed, or spaced, relation by the timing gears.

*Timing.*—Timing is the act of setting, or locating, the timing gears relative to the rotors so that the main rotor threads may pass through the troughs of the gate rotor without making contact as indicated in Fig. 72. As shown in Fig. 71, the gate rotor timing gear 52 is usually made separately from its hub 53 and is adjustable therewith to facilitate the timing operation. This timing operation is explained in detail in Whitfield Patent No. 2,683,994.

Referring to Figs. 1 and 2, the housing 10 of the pump contains two parallel cylindrical chambers 12 and 14 disposed side by side in parallelism and merging into one another, forming a common chamber, the cross-section of which is somewhat in the form of a figure 8. One end of the housing is provided with an integral end wall 16 which forms one end wall of the chambers 12 and 14. The other end of the housing is provided with a removable end wall 18 which is centered in the rotor chambers by the re-entrant internally tapered extension ring 20 and the centering plate 22. The centering plate 22 is centered in the housing chamber by its outside diameter and is centered on the end wall 18 by the cylindrical projection 24.

The head 18 is provided with circular openings 26 and 28, opening 26 being provided with a bearing bushing 30 for the main rotor shaft 32 and the opening 28 receives the projection 24 on the centering plate 22. The centering plate is provided with a bearing bushing 34 for the gate rotor shaft 36. The integral end wall 16 is also provided with openings 38 and 40 which are provided with bearing bushings 42 and 44 respectively. Main rotor 46 is fixedly attached to the shaft 32 and the gate rotor 48 is fixedly attached to the shaft 36, the rotors revolving in their respective chambers and being maintained in timed relation by the timing gears 50 and 52 fixedly attached on the main rotor shaft 32 and gate rotor shaft 36 respectively.

Referring to the drawings, the motor employed to il-
A portion 144 of the end wall 16 is offset from the remainder of the wall to form one side of the suction port 54, the exact shape of the suction port being described later. Diagonally opposite the suction port 54 is the discharge port 56 which also may have one side wall offset and recessed into the end wall 18, also described in detail later. The open end of the housing is so formed that the intersecting chambers 12 and 14 form a support to locate and properly center the end wall 18 with chambers 12 and 14, the re-entrant ring 20 and the centering plate 22 fitting within the ends of said chambers. Since the shaft openings 38 and 40 in the integral end wall 16 are machined centrally with the rotor chambers 12 and 14 respectively, the central location of the rotors is assured and they may operate in their chambers with very small clearance without liability of contacting the housing. The re-entrant ring 20 and the centering plate 22, while fitting neatly with their respective chambers 12 and 14, are slightly larger in diameter than the respective rotors 46 and 48 to provide a fixed running clearance between the rotors and chamber walls. Various methods of controlling the thrust of the rotors are applicable and well known in the art and therefore special thrust means are not shown or claimed. However, it will be understood that suitable thrust means will be employed.

The rotor members which are mounted within the housing chambers comprise mating helical screw thread members 46 and 48 which are arranged to operate within the intersecting cylindrical chambers 12 and 14 respectively. For convenience the member 46 is termed the main rotor and the member 48 is termed the gate rotor. Power may be applied to the rotors to force fluid from the suction port to the discharge port against pressure, or fluid may be supplied to the device under pressure and the device then will act as a motor to supply rotative power.

The main rotor 46, as shown, is provided with three circumferentially evenly spaced helical threads 58, 58' and 58" of identical contour, the details of which are later described. The rotor 46 preferably operates within its chamber without making contact with the housing, the end walls, or the other rotor. As an alternatitve it could have only two threads or more than three threads, if desired.

The gate rotor 48, as shown, is provided with four circumferentially evenly spaced helical threads 64, 64', 64", and 64''' which are formed so as to be complementary to the main rotor threads and the gate rotor also preferably operates without contacting the housing or the main rotor. Likewise, as an alternative, the gate rotor could have more or less than four threads, if desired, but the ratio of three main rotor threads and four gate rotor threads is preferred.

After the rotors are assembled within the housing the gears 50 and 52 are properly located on the respective shafts 32 and 36 to correctly "time" the rotors. That is, the timing gears must be so located relative to the rotor threads that, as the rotors revolve, the rotor threads will be restrained by the timing gears from contacting each other. This will be described later in detail as it is an important part of this invention.

In describing the details of the rotors that form the principal object of this invention, reference is made especially to Figs. 3, 5, 6, 7, 8 and 9. Other references will follow as the description progresses.

In Figs. 1 through 4, the main rotor 46 is shown with the ends of the threads cut away from the land at the tip 72 to the land at the root 74 in a tapered manner thus forming a rotor having a uniform end section and a non-uniform end section. In the uniform end section the cross-sectional shape does not change; while in the non-uniform end section the cross-sectional shape changes continuously, generally tapering toward the end. The sides of the threads are generated, or described, throughout their length, by the gate rotor. The outer portion 76 of the thread surface is generated by the intersection protuberance 78 of the gate rotor, the root portion 80 is generated by the crest edge 82 of the gate rotor, and the congruent band seal zone 84 is formed by the intersection of the generated curves 76 and 80. The generated outer portion 76, the congruent band seal zone 84, and the generated root portion 80 extend entirely across the uniform rotor end section and continue across the non-uniform rotor end section, ending at the crest edges 104 of the tapered portion of the threads in the non-uniform end section.

Another description of the nature of the main rotor would be to state a rotor is made with a uniform cross-section throughout its length, using any desired cross-sectional form, and then one end or corner of each thread is cut away to form the non-uniform end section. The threads are preferably cut away in a conical manner as shown, the tapered tip land surface forming an angle of about 30° in relation to the shaft center. Of course the tapered surface need not form a straight line but can be made in any form to easily seal with the gate rotor and housing, or gate rotor and end wall. The cutting angle also need not be 30° but can be made as desired. However, the preferred form is shown.

It appears that the removal of the corners of the main rotor threads and the addition of the cone to the gate rotor may appear to reduce the capacity of the device. However, this is not necessarily true as blowers with this feature can be operated at higher speed and also, since the cone in the gate rotor provides for a larger shaft and support for the threads, the troughs in the gate rotor may be made deeper in the uniform end section of such rotors. Thus the advantages of the invention can be utilized without a loss in capacity.

Other suggested forms for cutting away the main rotor threads would be complementary to the gate rotor forms shown in Figs. 88 to 101 inclusive. The point of intersection 84 of the two curves 76 and 80 may be reduced slightly, if necessary, to better form a congruent seal with the band seal zone 86 on the gate rotor but it has been found that the two curves 76 and 80 form a very nearly smooth meeting under usual conditions and further smoothing may not be necessary or desirable as this same intersection point 84 describes the band seal zone 86 on the gate rotor.

The land 74 at the root of the threads is a helical surface uniform in width and diameter throughout the length of the rotor and forms a rolling seal with the land 88 on the tip of the gate rotor which is likewise uniform in width and diameter throughout the length of the rotor. The land 72 at the tip of the thread of the main rotor is uniform throughout the uniform section of the rotor and forms a seal with the wall of the chamber 12 in the housing 10. The land at the tip of the thread in the non-uniform end section of the main rotor is non-uniform, widening toward the end of the rotor as its diameter decreases, and forms a seal with the internally tapered ring 20. The generating lines that describe the generated surface of the threads 58, 58' and 58" are shown on Fig. 9 extended beyond the thread for clarity. The line 90 that generates the outer portion 76 of the thread is clearly shown being described by the protuberance 78, and the line 92 that generates the root portion 80 is clearly shown being described by the crest edge 82. The lines 90 and 92, Fig. 9, cross over each other and form an intersection, or protuberance, and this protuberance is given the reference number 123 if it is not modified but, under certain conditions, it may be desirable to modify it slightly and then it comprises a band seal zone 84. The difference between the protuberance 123 and the band seal zone 84 may be very small but it is believed necessary to distinguish between them for clarity.

Figure 3:
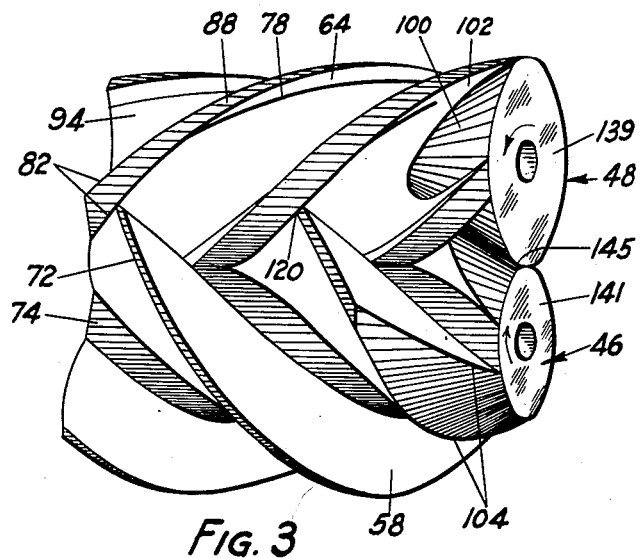
Fig. 3 is a perspective view of a pair of rotors per se embodying the invention.
Figure 4:
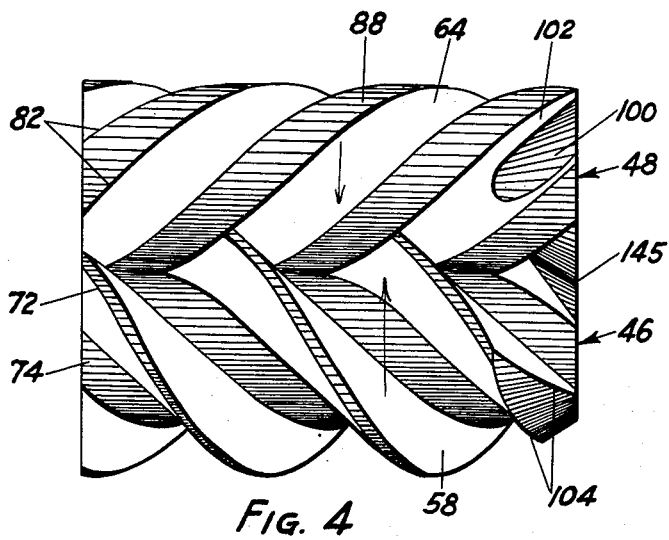
Fig. 4 is a plan view of a pair of mating rotors, in mesh, having more than normal length and especially adaptable for high pressure.

In Figs. 1 and 3 the gate rotor 48 is shown with the troughs 94 having a uniform end section and a non-uniform end section. In the uniform end section, the trough 94, in the root portion 96, is described by the crest edges 98 of the main rotor and the tip band seal zone 86 is described or formed by the intersection 123 or band seal zone 84 between the generated surfaces 76 and 80 on the main rotor. The base 100 of the trough in the non-uniform end is generally in the form of a cone, the outside end of the cone being the same diameter as the gate rotor and the cone tapering to the deepest part of the trough. The cone forms a complementary sealing surface with the tapered end of the main rotor. The generated curve 102 is continuously changing and is generated by the crest edges 104 on the tapered end of the main rotor. Thus a continuous seal is maintained the full length of the rotors at all times and eliminates the formation of closed pockets when the pockets run out at the discharge end. The band seal zones 84 and 86 on the rotors need not be generated but can be formed in any manner that will blend with portions 80 and 76 on the main rotor and 96 on the gate rotor and form a wide, substantially congruent seal between the threads.

These rotors represent what is termed "multiple arc generation," as the threads on both rotors are described or generated by a plurality of arcs. This is to be distinguished from single arc generation, the differences being shown in Figs. 11 to 16 inclusive. Fig. 15 shows the difference between single and multiple arc generation on the main rotor, the threads being thicker at their root when multiple arc generation is used. In Fig. 15, the full lines 105 comprise the form produced by multiple arc generation, and the dotted lines 106 comprise single arc generation. On the gate rotor, multiple arc generation changes only the tip as shown in Fig. 16, the points 108 being removed by multiple arc generation to form the band seal zone 86. Fig. 12 shows multiple arc generation with a portion of a gate rotor thread located in various positions, and Fig. 11 shows a similar view relative to single point generation. Fig. 13 shows a gate rotor formed by multiple arc generation, the main rotor being shown in various positions of engagement therewith. Fig. 14 is a view similar to Fig. 13 except that it pertains to single arc generation.

Fig. 17 shows the seal line 109 on the main rotor. On the tapered end of the main rotor, the seal line 110 is at the line of tangency and this is an important part of the invention as the seal line cuts off the suction and discharge pockets and prevents them from crossing the center line and thereby criss-crossing each other and forming sealed pockets as described more fully later. The complementary seal line 113 on the gate rotor is shown in Fig. 18.

Fig. 19 shows a sealing line 111 on the side of a thread of the main rotor as produced by single point generation. Fig. 20 shows the crest edge of the gate rotor in position to form part of the seal line in Fig. 19, while Fig. 21 shows a view similar to Fig. 19 except that multiple arc generation is used. At a certain position during rotation, the tip of the gate rotor forms a congruent seal, as shown in Fig. 22, with the main rotor thread forming a band seal zone 112 and another seal zone on each side of the band seal zone which gradually tapers into and out of the band seal zone, which zones are termed twilight band seal zones 114 because they are the period of changing from line sealing to band sealing. Fig. 23 shows a single arc generation seal line 115 on the gate rotor and Fig. 25 shows a multiple arc generation seal line 117 on the gate rotor. This seal line 117 on the gate rotor is complementary to the seal line 112 on the main rotor when the rotors are in mesh. Figs. 19, 21, 23 and 25 show the rotors opened up and untwisted for clarity. Further, it is to be understood that the seal lines shown in the last mentioned figures progressively move axially along the rotors from the suction to the discharge end thereof, continuously running out at the discharge end and continuously forming anew at the suction end of the rotors as the rotors rotate. For clarity, only one seal line is shown on each thread but actually, there are always two or more threads forming seals at any given time as shown in Figs. 17–18.

Figs. 28 to 33 show the rotors with multiple arc generation in various positions of engagement to illustrate continuous sealing. Fig. 28 shows the main rotor thread in full mesh and the tips of the gate rotor are in the twilight sealing zones. The left side is leaving the band sealing zone and the right side is just entering it. Fig. 30 shows congruent band sealing on the right side. In Fig. 32 it would appear that the seal between the rotors is broken due to the fact that the extreme tips of the rotors do not make sealing contact at the intersection of the two housing chambers 12 and 14. However, the seal is actually still intact but is located further along the threads, as is shown in Fig. 21. The rotors in Fig. 32 would be at position 116 in Fig. 21 and the opening 120 between 116 and 118 represents what appears to be a break in the rotor seal in Fig. 32. However, the seal line between the rotors is not broken as shown in Figs. 17 and 18. The opening 120 actually leads to a trailing pocket on the same side of the rotors, which is sealed by the suction end wall. Thus, there is never any direct opening, or leakage path, between the suction and discharge ports of the housing. In any event, this opening 120 is very small and its size can be controlled by the size and location of the band seal zone on the main rotor as explained later. Further, this opening 120 disappears in the non-uniform rotor end section where the pressure is highest and an effective seal most desirable.

With further reference to the wide seal band extending into the high pressure area, it would be highly undesirable to allow high pressure air, after being compressed to maximum pressure, to leak backward into a trailing pocket which contains low pressure air. Such mode of operation would represent a loss in efficiency. Thus, by combining multiple arc generation and rotors with conical ends, these two features complement each other and greatly increase their individual desirability. The opening 120, Fig. 32, is formed at the suction end of the rotors and advances along the crest edge of the main rotor through the uniform section in the low pressure area and runs out in the non-uniform end section of the rotors, which is the high pressure area. The time of the run-out of the opening 120 can be altered by changing the location of the band seal zone 84 as shown in Figs. 82 and 83. The leakage through this opening 120 may not be acceptable when applied to rotors that are uniform throughout their length as in Fig. 79. Likewise, the conical ends of the rotors would lose much of their advantage if they were to be used without the desirable effects of the band seal zone where the pressure is highest, and the leakage difficult to control. The fact that multiple arc generation and rotors with conical ends fully complement each other is an important part of this invention.

Figs. 34 to 36 inclusive show the action of a cutter in forming the gate rotor and the manner in which it compares with the action of the main rotor. The cutting tools 122 simulate the crest edges 98 on the main rotor and the cutting tools 124 simulate the intersection 123, Fig. 9, between the curves 76 and 80. As the cutter head 126 revolves in timed relation with the gate rotor the proper generated form is produced. This is clearly evident because the tips of the tools that do the cutting, or forming, simulate a sealing position on the mating rotor.

The complete machine for forming these rotors is shown and described in Whitfield Patent No. 2,792,763, and that machine could be used without change for cutting the gate rotors by merely adding the tools 124. The rotors could also be formed by planing, as shown in Whitfield Patent No. 2,473,233, and reference is invited to these patents.

Fig. 37 shows the position of the tools 122 and 124 in relation to the outline of the main rotor. Fig. 38 shows the gate rotor being generated by single point generation. That is, the two tools in the tip of the cuter head represent the two crest edges of the main rotor thread. Figs. 35 and 36 show the action of these tools. An alternate method and means for forming the band seal zone 86 is shown in Fig. 39.

In using the machining methods shown in Figs. 34 to 39 inclusive, the gate rotor would be formed as a uniform rotor throughout its length and then one end would be taper-bored as in Fig. 44, said Fig. 44 being a section on line V—V, Fig. 42, untwisted, and shown as viewed from two different angles for clarity, and the tapered cone 125, Figs. 45 and 46, would be inserted and welded in place as shown in Fig. 47. The fillets 128 formed by the welding process would then be finished to the continuously changing generated curve 102, Fig. 8, as described by the crest edges 104, Fig. 7, on the tapered end of the main rotor.

The cone 125 is of the proper size and shape to make an operating seal with the tapered section of the main rotor. In the event it is desired to make the gate rotor in one piece, then the process described could not be used. For one piece gate rotors, they could be made by a duplication process using the main rotor or a finished gate rotor as the template to control the form. This process will be disclosed in a subsequent patent application.

Figs. 40, 41 and 42 show the action of a cutter in forming a main rotor in relation to the action of the gate rotor, which the cutter simulates. The inner cutting point 130 simulates the intersection protuberance 78, Fig. 6, on the gate rotor and generates the outer thread portion 76, Fig. 5, on the main rotor, the outer cutting point 132 simulates the crest edges 82 of the gate rotor and generates the root portion 80 of the main rotor thread, and the band seal zone 84 is generated in an overlapping manner by both cutting points 130 and 132. This overlapping condition is shown in Fig. 9 and develops a very small protuberance 123 which may be modified if desired. As previously pointed out, this protuberance 123 is actually the same point on the main rotor thread as the band seal zone 84, except that in zone 84 it may be modified slightly to provide better sealing with the band seal zone 86 on the gate rotor while 123 is the protuberance as actually developed by the two curves 90 and 92 without modification. The width of the band seal zone 86 on the gate rotor effects the prominence of the intersection 123. If desired, and to avoid a separate operation in modifying the protuberance 123, extra cutting points could be used between the points 132 and 130, Fig. 40, to simulate the band seal zone 86 on the gate rotor. Likewise, multiple cutters could be used instead of the single cutter 124, Fig. 34, and the points of these cutters would simulate the band seal zone 84 on the main rotor. The action of the cutting may be rotary as in Whitfield Patent No. 2,792,763, or may be planing as in Whitfield Patent No. 2,473,233. Fig. 43 shows a side view of the cutter head 133 which is actually a short piece of gate rotor with cutting tools attached to each corner for cutting.

The cutting tools for both the gate rotor and main rotor may be formed with sharp points for point generation, or with rounded points for arc generation. It may appear that tools with rounded points would fail to function properly but actually they have proven to be fully satisfactory as the cutting tips do not wear away so quickly. Since there is relative longitudinal movement between the cutting tools and rotor as generation proceeds when using the rotary generating machine as described in Patent No. 2,792,763, the forward edge of the tool does the actual work and this edge can be shaped properly for cutting and at the same time maintain the helix angle of the rotors and the constantly changing contact angle between the cutting tools and rotor. A full description of the exact form of the cutting tool points for either planing or rotary generation is very difficult to set forth but long experience in cutting rotors by single arc generation demonstrates the feasibility of these two types of generation.

Fig. 48 is a fragmentary longitudinal section taken on line D—D of Fig. 49, through the rotors, untwisted, to show the coaction of the two conical sections of the rotors. Fig. 49 shows and end view of the suction end of the rotors in fully meshed position.

Fig. 50 shows an end view of the conical or discharge end of the rotors. The diameter of the gate rotor cone is the same as the outside diameter of the rotor and therefore the threads 64 run out against the side of the cone providing the end of the rotor with an uninterrupted circumference 139, the rotor having a flat end surface.

The threads of the main rotor are cut away from the tip 72 to the land at the root of the threads 74, providing the end of the main rotor with an uninterrupted circumference 141 having a flat end surface. The two circles 139—141 forming the ends of the rotors are tangent on the center line 143 between the shafts and fluid being pumped is discharged completely before reaching the center line 143 as the discharge pocket runs out completely at that time as shown at 145. Since the end of the suction pocket is not open to the discharge end wall until after passing the center line 143 it can be said that these rotors are self-sealing endwise so far as the discharge end is concerned. This will be discussed in detail later. Figs. 51 to 53 inclusive are sections taken on the lines E—E, F—F, and G—G, respectively, in Fig. 48 through the non-uniform end section of the rotors and illustrate how the cross-sectional shape changes continuously throughout the non-uniform end sections. They also disclose how the depth of the gate rotor troughs decrease in depth from Fig. 49 through sections G—G, F—F, E—E and finally decreasing to zero, or running out, as in Fig. 50. Figs. 1, 3 and 50 clearly demonstrate how the pockets run out completely without forming high pressure areas. Fig. 54 is a development of the tapered section of the rotor end and is included for clarity.

Fig. 55 shows a plan view of the housing 10 partially broken away to show the suction port 54. The discharge port 56 is on top and is shown in full. The operating characteristics of a blower of this type are determined by the outline of the port edges, especially the discharge port edges 134 and 136. These are usually formed as an extension of the curved rotor chamber walls and are located by the threads on the main and gate rotors which have been turned to the proper position of rotation. After a suction pocket has been formed and filled with fluid, the continued rotation of the rotors causes the pocket to be sealed at the suction end by the housing end wall 16, and the rotor threads are then in the position shown in Fig. 1, forming pocket 138. The sealed pocket here is maximum size and justing starting to decrease as the rotors continue to revolve. As the rotors revolve this pocket 138 decreases in volume until the fluid is released by the discharge port edges 134 and 136, Fig. 55.

Thus, the degree of internal compression is controllable from zero internal compression to maximum internal compression simply by shifting the position of the port edges 134 and 136. The port edges 134 and 136 are located by the trailing crest edges of the rotor threads when the pocket 138 has been decreased in volume to the extent that the selected internal compression has been produced. Further rotation of the rotors then releases the contents of the pocket to the discharge port and still further rotation of the rotors discharges all the fluid and the fluid is prevented from re-entering the rotor chambers by the trailing pockets of fluid.

The corresponding edges 140 and 142, Fig. 55, of the suction port are likewise located by the trailing crest edges of the threads of the rotors but by the trailing threads forming a pocket when that pocket has expanded to its fullest extent. If the sealing by the port edges 140 and 142 was delayed beyond this point, then some of the fluid would be forced backward out of the suction port since compression begins at this point with properly located port edges. The location of the suction port edges generally is not as critical as the location of the discharge port edges.

Fig. 56 shows the suction end wall 16, together with the depressed area 144, and the edge 146 of the suction port which, together with the port edges 140—142, form the critical lines of the suction port. Usually the rotor threads make their seal with the seal line 146 before sealing with the port edges 140–142 as it is not necessary to seal with all seal lines at the same instant. The protuberance 148 is located so as to seal the end of the pockets to prevent back flow from the pressure side, as seen in Figs. 62, 63 and 64. In Fig. 56 the open end of the housing 10 is shown looking against the closed end wall 16 and the suction port 54 is shown in section.

Fig. 57 shows the housing in section looking against the removable end wall 18 and also shows the outline of the discharge port as it affects the end wall 18. The centering plate 22 is fixedly attached to the end wall 18 by suitable bolts and this centering plate together with the tapered integral ring 20 centers the bearing bores accurately with the centers of the rotor chambers. This is an important feature and is essential for good blower design.

The edge 150 of the centering plate 22 forms part of the port outline and the centering plate 22 is slightly larger in diameter than the gate rotor to provide running clearances for the rotor. The line 152 forms another part of the port outline and where it intersects with the centering plate 22, it extends to the center line as shown in Fig. 57. The importance of this point will be explained later. There is a small offset 154 from the face of the end wall 18 to the port side wall 156 which serves as a relief but is not a necessity with this type of rotors, as it is in other screw pumps. Fig. 59 shows the end wall 18 together with the integral conical ring 20. The inner tapered bore of this conical ring 20 forms a running seal with the tapered end of the main rotor. The end 158 of the tapered ring 20 is formed arcuate to provide a close running fit with the outside diameter of the gate rotor and completes the seal. This tapered portion 20 of the end wall could, of course, be formed with the housing instead of with the end wall, or could be made separately, but it is preferred to form it as described.

In Figs. 62, 63 and 64, the heavy line indicates the outline of the discharge port in the end wall of blowers having rotors with uniform sections throughout their length. The ends of the rotors in these three views are shown in phantom for the sake of clarity. The protuberance 160 is a continuation of the wall 162 and the surface on the right side of the heavy line is lowered and forms the side wall of the discharge port 56. In Fig. 62, the threads of the two rotors are just meshing at their tips and an enclosed pocket 164 is formed because of the sealed threads and the end wall protuberance 160. The extent of this sealed pocket 164 is better shown on Fig. 10 which shows its area and also its length, the length being from points 163 to 165. Considering the protuberance 160 as covering the pocket in Fig. 10, it will be seen that the fluid is trapped and must be squeezed out through the normal running clearances. In Fig. 63 the rotors have revolved slightly and the discharge pocket 164 has very nearly run out, but the end of a new pocket 166 is forming. This pocket 166 is actually the extreme end of a suction pocket and thus is interposed between the discharge pocket 164 and the discharge port 56. The protuberance 160 is thus placed to prevent discharge air leaking into the suction pocket 166 during the passage of each thread through this period of rotation. To overcome this condition is of great importance in this invention. This condition exists on all types of axial flow devices that have uniform rotors throughout their length and many methods have been devised to help relieve the closed pockets as, for example, in Whitfield Patent No. 2,287,716. However, all these relief means have had certain limitations. They may create a new leakage path directly to the suction side or they may take the form of a notch or groove in the rotor, in which event they carry a certain amount of fluid around to the suction side, thereby creating a loss. This invention discloses a method of avoiding sealed pockets and exhausting all pockets completely to the discharge port without introducing some new kind of leakage, loss, or other disadvantages.

Figs. 65 to 70 show an alternate form of rotors for eliminating the closed pockets. In this form the threads on the gate rotor are tapered and the spaces between the threads on the main rotor are formed to complement the gate rotor. Fig. 65 shows a partial cross-section, untwisted, through the rotors on section L—L of Fig. 66, the cone in this design being added to the main rotor and the gate rotor threads being cut tapered. Their operation is similar to the first disclosure in the preceding figures. However, the first disclosure is preferred for reasons of mechanical design. Fig. 66 shows the suction end of the rotors, which is the same as in Fig. 49. Fig. 67 shows a discharge end of the rotors which is quite different from the discharge end of the rotors shown in Fig. 50. Figs. 68 to 70 inclusive are sectional views on lines M—M, N—N, and O—O in Fig. 65, and show various cross-sections of the mating rotors.

Fig. 71 shows the power transmitting elements forming what may be tremed the power circuit. The power is usually applied to the main rotor shaft 32 because the main rotor consumes most of the energy. The power is applied to the gate rotor through the timing gears 50 and 52 and through the gate rotor shaft 36. In devices having uniform rotors, it usually is not possible to provide the gate rotor with a large shaft because of the depth of the troughs 94. Reducing the depth of the troughs to increase the shaft size reduces the capacity of the device which is not desirable. By using a conical end in the gate rotor, a large, rigid shaft can be used without decreasing the capacity throughout the rotor. Fig. 72, at 168, shows where running clearance, illustrated in exaggerated manner, is necessary to allow for torsional resilience of the shafts. The more rigid the power circuit the smaller the running clearances 168 may be. Also, in this disclosure, the threads on the gate rotor are well supported against deflection by the conical end section 100 which forms the base of the troughs in the non-uniform rotor end section. This is another feature that enhances the desirability of rotors having non-uniform end sections.

Fig. 75 shows the intersections between the various curved surfaces of the main rotor thread not rounded, which is termed point generation. Likewise in Fig. 76, the intersections of the curved surfaces of the gate rotor thread are not rounded, which is also termed point generation. Alternate forms are shown in Figs. 73 and 74 where all the intersections of curves on the threads are rounded and form arcs. The latter forms are termed arc generation. It is generally preferred to provide arcs on all these intersections as better sealing results.

Fig. 77 shows an assembly of a blower that has provisions for liquid cooling of the rotors and housing. Heretofore it has not been possible to liquid cool the gate rotor because the threads were usually too thin. To make them thicker reduced the capacity of the device. In this disclosure the end of the gate rotor 48 is conical and this cone is made hollow with connecting passages to and from the passages in the gate rotor shaft 36. Thus, fluid enters the rotor shaft through the gland 170, passes through the shaft to the connection passage 172 and into the cooling space 174. After filling this space, it passes out the opposite end of the shaft. The main rotor is cooled in a like manner. The housing and discharge end wall may also be liquid cooled by the use of the jacketed walls as shown.

Fig. 78 shows an alternate method of cooling the rotors in which the liquid enters through the tube 176 coaxial with the shaft 36 into the cooling space 174 and thence returns through the annular space 175 surrounding the tube to the outlet in the side of the shaft. The construction of the liquid cooled device may otherwise be the same as a non-cooled device.

In devices of this general nature the running clearances must be held within very close limits or the device is inefficient. However, the problem is complicated by expansion of the parts caused by the heat of the compression. It generally is not desirable to cool the housing without cooling the rotors because the rotors will be the hottest and expand and cause contact with the cooled housing. Thus it has been necessary heretofore to run such devices without liquid cooling. Cooling in the new device comprises an important feature thereof. The cooling, as shown, is applied to the gate rotor at the discharge end only as heat is developed principally in this section. The cone could be made longer as in Fig. 88 to extend the cooling if desired but the preferred form is shown approximately in Figs. 77 and 78.

It will be seen that the conical end of the gate rotor has five principal advantages of considerable importance. It eliminates the closed pockets, provides for larger shafts, provides better sealing in the high pressure area, affords liquid cooling, and provides support for the threads to prevent deflection, especially in the high pressure zone. Also, the multiple arc generation of the rotors is of special advantage in that the wide sealing band occurs near the root of the threads and thus carries into the high pressure zone where extra sealing is desirable. Also, the small opening 120, Fig. 32, has run out before reaching the high pressure area as the rotor tips change shape due to the tapered main rotor threads and the small opening 120 no longer occurs. The small opening 120 leading back to the trailing pocket would be least desirable in the high pressure zone as the pockets are running out during this period of rotation.

Fig. 80 shows a plan view of a discharge end wall of the housing, which is an alternate design to that shown in Fig. 57, illustrating that none of the sealing surface need come above the center line, except surface 179 to seal the shaft near the bearings. The protuberance 178 which would be necessary for uniform rotors, and shown as 160 in Figs. 62–64, is not necessary at the discharge end for the non-uniform rotors disclosed in Figs. 1–4.

Since the conical surface 100 has been added to the gate rotor, the fluid being pumped exerts a thrust pressure longitudinally with the shaft. To balance this thrust, fluid under pressure is allowed to be exerted on the flat end 139, Fig. 50, of the gate rotor by a relief pocket 180 as shown in Figs. 80 and 81.

Fig. 82 shows the band seal zone 84 on the main rotor to be located higher on the rotor thread than in Fig. 5. In this instance, the gate rotor tip is changed very little from single arc generation. In Fig. 83 the band seal zone is located at the root of the threads. This requires a major change in the tip of the gate rotor threads. However, the location as shown in Fig. 5 is preferred. It is evident that more than one band seal zone can be used on the side of each rotor thread. For example, the band seal zones as shown in Figs. 5, 82 and 83 could all be used together or the combination of any two of the locations could be selected. However, if the band seal zone is too wide, or if too many are used, the opening 120, Fig. 32, may become large enough to defeat any advantage that may be produced by greater seal area. It is believed that the location of the band seal zones is more critical than the number used. The number of these band seal zones used and their location will be determined by the conditions under which the device is to operate.

Fig. 84 shows the diameter of the gate rotor to be larger than its pitch circle 185. Similarly, the gate rotor could be smaller in diameter than its pitch circle, within the spirit of the invention. To prevent undercutting at the root of the main rotor threads the corners of the gate rotor threads must be rounded, or broken, from the tip to the pitch circle as shown, when said gate rotor is made larger than its pitch circle.

Fig. 85 shows an asymmetrical thread with one side 181 of the main rotor and gate rotor formed by multiple arc generation, while the other side 182 of each thread is circular as shown, the bottom portion of the circular side of the main rotor thread being generated. It should be noted that rotors with the above described conical end sections may have any of the well known cross-sectional shapes in the uniform end section. For example, Whitfield asymmetrical in Patent No. 2,473,234, and Lysholm asymmetrical in Patent No. 2,243,874, Whitfield symmetrical in Patents Nos. 2,180,377 and 2,180,378, and Nilsson in Patent No. 2,622,787. However, it is preferred to use multiple arc generation in combination with the non-uniform rotors as it increases the effectiveness of the seal in the high pressure area.

Fig. 86 shows a pair of meshed rotors, untwisted, wherein the conical section in the gate rotor is larger than the outside diameter of the rotor and the end of the main rotor is reduced accordingly. Fig. 87 shows a pair of rotors in mesh, untwisted, that have a short cylindrical portion on the end of each conical section. This would be effective in providing increased sealing.

Fig. 79 shows a pair of rotors in mesh having multiple arc generation, fully described heretofore, without the conical end sections, and therefore being uniform throughout their length.

Figure 92:
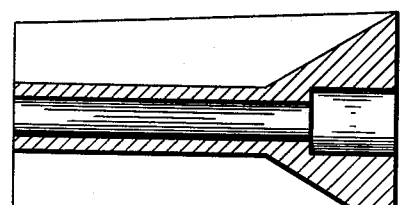
Figure 100:
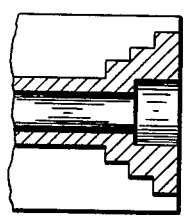
Figure 96:
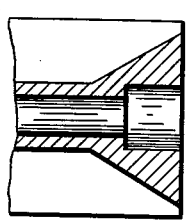
Figure 91:
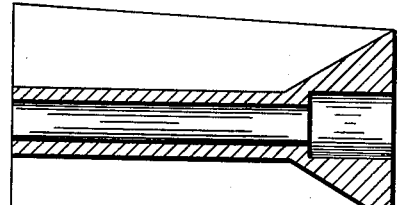
Figure 99:
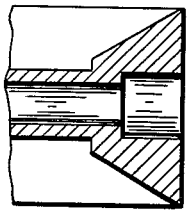
Figure 95:
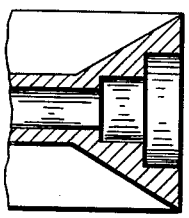
Figure 90:
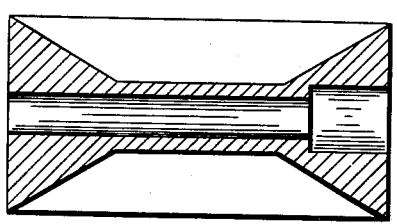
Figure 98:
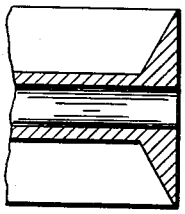
Figure 94:
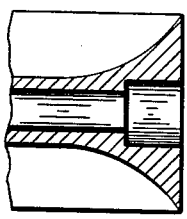
Figure 89:
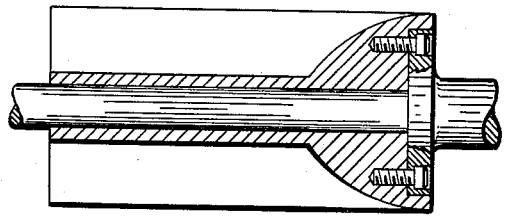
Figure 93:
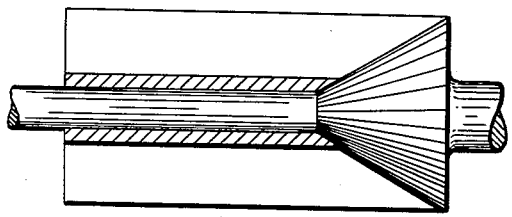
Figure 88:
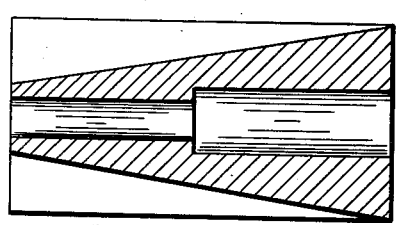

Figs. 88 to 101 inclusive show various alternative forms for the gate rotor, the main rotors not being shown, but the main rotors would be formed complementary to the form of gate rotor selected. Since all these alternate forms would produce similar results in various degrees, the form chosen would depend upon the manner of producing the rotor and the use for which the device was to be employed, it being recognized that some will be more effective under certain conditions than others. Manufacturing costs also will vary for the different forms and this also will be a factor in the selection of one form over another. For example, for extremely high pressure and excess cooling space, Fig. 88 may be chosen. Also, Fig. 98 may be chosen for maximum capacity and low pressure and low speed. The rotors in Figs. 91 and 92 are tapered slightly on their outside diameter and their shafts may be parallel or non-parallel. Fig. 100 shows a stepped cone and could be useful for certain methods of forming the finished rotors. Fig. 90 shows a rotor with a cone on each end. This may be useful where the device must operate in either direction. When the many forms the non-uniform end of the rotor may take and the numerous possible cross-sections in the uniform end are considered, the combinations become beyond the possibility of individual description. However, the operating principles would remain the same in all combinations and it is intended that they be included within the scope of this disclosure.

In all these Figs. 88 to 101 inclusive, the rotors have been shown untwisted for clarity. Also, while it is preferred to make the rotor shafts parallel for ease in construction, they may be slightly non-parallel with the same advantages. With non-parallel rotor shafts at least one of the rotor chambers will be tapered but both rotor chambers need not necessarily be tapered.

Since the conical end feature for the rotors described hereinabove has been disclosed in regard to devices of relatively large capacity and low pressure, it is to be understood that the same principles of the invention are also applicable to devices of relatively low capacity and high pressure.

While the device has been described for use generally as a blower, compressor or supercharger for reasons of simplicity, the same features that make it desirable for such uses also make it highly adaptable for other uses such as meters, air motors, hydraulic motors, steam motors, explosion motors, measuring devices and numerous other uses in a wide variety of fields. It is especially suitable as a meter, when used without internal compression, since the elimination of the sealed pockets also eliminates all internal work done between the rotors and thus it operates with almost no pressure drop across the device.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. In a pump having a housing provided with suction and discharge ports arranged therein respectively adjacent opposite ends of said housing and said housing also having intersecting cylindrical bores, a pair of mating threaded helical rotors each having threads and troughs and rotatably supported within said cylindrical bores of said housing and cooperating with each other and said housing to form pockets at the suction end and advance the same axially with the rotors and exhaust at the discharge end of the housing through said discharge port as the rotors revolve in opposite directions about the axes thereof, the threads of each of said rotors having sealing engagement with the troughs of the mating rotor within which troughs said threads are received as the rotors are rotated to advance the pockets therealong; said rotors at the ends adjacent the discharge port of the housing each having generally conical surface sections merging with the threads thereon and providing complementary surfaces on said rotors forming a seal between said complementary surfaces at said ends of the rotors operable to close the advancing pockets as they progress to the discharge port of the housing, whereby said pockets decrease to substantially zero adjacent said discharge port.

2. The pump set forth in claim 1 further characterized by the generally conical surface section on one rotor having the larger end thereof substantially equal to the diameter of said rotor and tapering inwardly toward the other end of said rotor, and the smaller end of the generally conical surface section of the other rotor being substantially coincident with the root of the threads thereon and diverging outwardly toward the other end of said rotor.

3. In a pump having a housing provided with suction and discharge ports respectively adjacent opposite ends of the housing and said housing also being provided with intersecting cylindrical bores, a pair of mating threaded helical rotors each having threads and troughs and rotatably supported in said housing and cooperating with each other and the housing to form pockets at the suction end of the housing and advance the same axially with the rotors to the discharge port as the rotors revolve about the axes thereof, said rotors comprising a main rotor on which the threads have generally convex sides, and a gate rotor on which the threads have generally concave sides forming troughs between the threads, one of said rotors having right-hand helical threads and the mating rotor having left-hand helical threads; said rotors being characterized by one of said rotors having its threads cut away at one end of the rotor to form conical surfaces on the ends of the threads, the cutaway portions extending substantially from said one end of the rotor and substantially at the greatest depth of the troughs at the bottom of the threads and terminating at the tips of the threads intermediately of the ends of said rotor; the mating rotor having a cooperating and complementary conically surfaced portion forming one end of each trough, the large end of said conically surfaced portion being at substantially one end of the rotor and substantially equal in diameter to the outside diameter of the rotor, said conically surfaced portion tapering inwardly to and blending with the rotor troughs at the full depth thereof intermediately of the ends of said rotor; whereby the large and small ends of the conical surfaces on one rotor are complementary to and cooperate with the respective small and large ends of the conical surfaces on the mating rotor to form a seal between said complementary conically surfaced portions adjacent to the ends of the rotors operable to cause the advancing pockets to run out as they progress to the discharge port of the housing and said pockets decrease to substantially zero adjacent said discharge port.

4. In a pump having a ported housing provided with suction and discharge ports respectively adjacent opposite ends of the housing and said housing also being provided with intersecting bores, a pair of mating threaded helical rotors each having threads and troughs and supported rotatably in said housing and cooperating with each other and said housing to form pockets at the suction end of the housing and advance the same axially with the rotors to the discharge port as the rotors revolve about the axes thereof; said rotors comprising a main rotor provided with threads and a gate rotor provided with threads and troughs therebetween, the sides of the threads on the main rotor being generally convex and said threads lying generally outside the pitch circle and the troughs of the gate rotor being generally concave and lying generally within the pitch circle; the threads on the main rotor being cut away at one end of the rotor in a manner to produce surfaces resulting in an effect similar to that produced by true conical surfaces on the ends of the main rotor threads, the cutaway portions extending from said one end of the rotor and substantially on the pitch circle at the root of the threads and terminating at the tips of the threads intermediately of the ends of said rotor; said gate rotor being provided in the troughs thereof with a portion complementary to the cutaway portions of the threads of the main rotor to produce surfaces resulting in an effect similar to that produced by true conical surfaces, said complementary surfaces rolling upon each other and the large end of said complementary portion of the gate rotor being substantially at one end thereof and substantially equal in diameter to the pitch circle of the rotor and the small end of said complementary portion blending with the trough surfaces of the gate rotor at the full depth thereof, whereby the large and small ends of the cutaway portions of the main rotor threads are complementary respectively to and cooperate with small and large ends of the complementary portion in the troughs of the gate rotor and form a seal between said complementary surfaces adjacent the ends of the rotors operable to cause the advancing pockets to run out as they progress to the discharge port of the housing and said pockets decrease to substantially zero adjacent said discharge port.

5. In a pump having a ported housing provided with suction and discharge ports respectively adjacent opposite ends of the housing and said housing also being provided with intersecting cylindrical bores, a pair of mating threaded helical rotors each having threads and troughs and rotatably supported in said housing and cooperating with each other and the housing to form pockets at the suction end of the housing and advance the same axially with the rotors to the discharge port as the rotors revolve about the axes thereof, said rotors comprising a main rotor provided with a plurality of helical threads having generally convex sides and troughs therebetween, and a gate rotor having a plurality of threads provided with generally concave sides forming troughs between the threads, one of said rotors having right-hand helical threads and the mating rotor having left-hand helical threads; said rotors being characterized by said main rotor having its threads cut away at one end of the rotor in a generally conical manner to form generally conical surfaces on the ends of the threads, the cutaway portions extending substantially from said one end of the main rotor and substantially at the greatest depth of the troughs at the bottom of the threads and terminating at the tips of the threads intermediately of the ends of said main rotor; said gate rotor having a cooperating and complementary conically surfaced portion formed in one end of the rotor and extending into the threads and connected to said threads to rigidify the same, the large end of said conically surfaced portion being at substantially one end of the rotor and substantially equal in diameter to the outside diameter of the rotor, said conically surfaced portion tapering inwardly to and blending with the rotor troughs to the full depth thereof intermediately of the ends of said rotor; whereby the large and small ends of the conical surfaces on one rotor are complementary to and cooperate with the respective small and large ends of the conical surfaces on the mating rotor and form a seal between said complementary surfaces adjacent the ends of the rotors operable to cause the advancing pockets to run out as they progress to the discharge port of the housing and said pockets decrease to substantially zero adjacent said discharge port.

6. In a pump having a ported housing provided with suction and discharge ports respectively adjacent opposite ends of the housing and said housing also being provided with intersecting cylindrical bores, a pair of mating threaded helical rotors each having threads and troughs and rotatably supported in said housing and cooperating with each other and the housing to form pockets at the suction end of the housing and advance the same axially with the rotors to the discharge port as the rotors revolve about the axes thereof, said rotors comprising a main rotor provided with a plurality of helical threads having generally convex sides and troughs therebetween, and a gate rotor having a plurality of threads provided with generally concave sides forming troughs between the threads, one of said rotors having right-hand helical threads and the mating rotor having left-hand helical threads; said rotors being characterized by said main rotor having its threads cut away at one end of the rotor in a generally conical manner to form generally conical surfaces on the ends of the threads, the cutaway portions extending substantially from said one end of the rotor and substantially at the greatest depth of the troughs at the bottom of the threads and terminating at the tips of the threads intermediately of the ends of said main rotor; said gate rotor having a cooperating and complementary conically surfaced portion forming one end of each trough, the large end of said conically surfaced portion being at substantially one end of the rotor and substantially equal in diameter to the outside diameter of the rotor and said conically surfaced portion being hollow to receive coolant fluid, said conically surfaced portion tapering inwardly to and blending with the rotor troughs to the full depth thereof intermediately of the ends of said rotor; whereby the large and small ends of the conical surfaces on one rotor are complementary to and cooperate with the respective small and large ends of the conical surfaces on the mating rotor and form a seal between said complementary surfaces adjacent the ends of the rotor operable to cause the advancing pockets to run out as they progress to the discharge port of the housing and said pockets decrease to substantially zero adjacent said discharge port.

7. In a pump having a ported housing provided with suction and discharge ports respectively adjacent opposite ends of the housing and said housing also being provided with intersecting cylindrical bores, a pair of mating threaded helical rotors each having threads and troughs and rotatably supported in said housing and cooperating with each other and the housing to form pockets at the suction end of the housing and advance the same axially with the rotors to the discharge port as the rotors revolve about the axes thereof, said rotors comprising a main rotor provided with a plurality of helical threads having generally convex sides and troughs therebetween, and a gate rotor having a plurality of threads provided with generally concave sides forming troughs between the threads, one of said rotors having right-hand helical threads and the mating rotor having left-hand helical threads; said rotors being characterized by one of said rotors having its threads cut away at one end of the rotor in a generally conical manner to form generally conical surfaces on the ends of the threads, the cutaway portions extending substantially from said one end of the rotor and substantially at the greatest depth of the troughs at the bottom of the threads and terminating at the tips of the threads intermediately of the ends of said rotor; the mating rotor having a cooperating and complementary conically surfaced portion forming one end of each trough, the large end of said conically surfaced portion being at substantially one end of the rotor and substantially equal in diameter to the outside diameter of the rotor, said conically surfaced portions tapering inwardly to and blending with the rotor troughs to the full depth thereof intermediately of the ends of said rotor; whereby the large and small ends of the conical surfaces on one rotor are complementary to and cooperate with the respective small and large ends of the conical surfaces on the mating rotor and form a seal between said complementary surfaces adjacent the ends of the rotors operable to cause the advancing pockets to run out as they progress to the discharge port of the housing and said pockets decrease to substantially zero adjacent said discharge port; and at least the conically surfaced portions of both rotors being hollow to receive coolant fluid for said portions.

8. In a pump having a ported housing provided with suction and discharge ports respectively adjacent opposite ends of the housing and said housing also being provided with intersecting cylindrical bores, a pair of mating threaded helical rotors each having threads and troughs and rotatably supported in said housing and cooperating with each other and the housing to form pockets at the suction end of the housing and advance the same axially with the rotors to the discharge port as the rotors revolve about the axes thereof, said rotors comprising a main rotor provided with a plurality of helical threads having generally convex sides and troughs therebetween, and a gate rotor having a plurality of threads provided with generally concave sides forming troughs between the threads, one of said rotors having right-hand helical threads and the mating rotor having left-hand helical threads; said rotors being characterized by said main rotor having its threads cut away at one end of the rotor in a generally conical manner to form generally conical surfaces on the ends of the threads, the cutaway portions extending substantially from said one end of the rotor and substantially at the greatest depth of the troughs at the bottom of the threads and terminating at the tips of the threads intermediately of the ends of said main rotor; said gate rotor having a cooperating and complementary conically surfaced portion forming one end of each trough, the large end of said conically surfaced portion being at substantially one end of the rotor and substantially equal in diameter to the outside diameter of the rotor, said conically surfaced portion tapering inwardly to and blending with the rotor troughs to the full depth thereof intermediately of the ends of said rotor; whereby the large and small ends of the conical surfaces on one rotor are complementary to and cooperate with the respective small and large ends of the conical surfaces on the mating rotor and form a seal between said complementary surfaces adjacent the ends of the rotors operable to cause the advancing pockets to run out as they progress to the discharge port of the housing and said pockets decrease to substantially zero adjacent said discharge port; and said gate rotor also having an axial opening to receive a shaft to support and drive said rotor, said opening having a larger diameter at the end of the rotor having the conically surfaced portion than at the other end to permit the use of a shaft larger at said one end than the other to comprise the driving end thereof.

9. In a pump having a ported housing provided with suction and discharge ports respectively adjacent opposite ends of the housing and said housing also being provided with intersecting cylindrical bores, a pair of mating threaded helical rotors operable in said cylindrical bores of said housing and cooperating with each other and the housing to form pockets at the suction end of the housing and advance the same axially along the rotors and discharge diagonally as the rotors revolve in opposite directions; said rotors comprising a main rotor provided with a plurality of helical threads having generally convex sides and each side including a generated outer portion extending inward from the crest edge on the tip, a generated root portion extending outwardly from the root, and an intermediate band seal zone; and a gate rotor provided with a plurality of threads having generally concave sides and each side including a band seal zone extending inwardly from the tip crest edge, a generated root portion, and an intersection protuberance therebetween; the main rotor being characterized by having threads with troughs therebetween and the outer portions of the threads being generated by the protuberances on the gate rotor, the root portions being generated by the tip crest edges of the gate rotor and the band seal zones being formed to fit and operate congruently with the band seal zones on the gate rotor; the gate rotor being characterized by having threads with troughs therebetween and the root portions of the threads being generated by the crest edges of the main rotor threads and the band seal zones being formed to fit and operate congruently with the band seal zones on the main rotor threads to provide a relatively wide seal on the band seal zones and relatively narrow seals on the remainder of the threads; and said rotors at the ends adjacent the discharge port of the housing also each having generally conical surface sections merging with the threads thereon and providing complementary surfaces on said rotors forming a seal between said complementary surfaces at said ends of the rotors operable to cause the advancing pockets to run out as they progress to the discharge port of the housing, whereby said pockets decrease to substantially zero adjacent said discharge port.

10. The pump set forth in claim 9 further characterized by the generally conical surface section on the gate rotor having the larger end thereof adjacent said one end of the rotor and substantially equal to the diameter of said rotor and tapering inwardly toward the other end of said rotor and blending with the roots of the troughs, and the small end of the generally conical section on the main rotor being substantially coincident with the roots of the threads thereof adjacent said one end of the rotor and said conical section diverging outwardly toward the other end of the rotor to the tips of the threads to form an unbroken seal for the full length of the rotors.

11. In a pump having a ported housing provided with suction and discharge ports respectively adjacent opposite ends of the housing and said housing also being provided with intersecting cylindrical bores, a pair of mating threaded helical rotors operable in said cylindrical bores of said housing and cooperating with each other and the housing to form pockets at the suction end of the housing and advance the same axially along the rotors and discharge diagonally as the rotors revolve in opposite directions; said rotors comprising a main rotor provided with a plurality of helical threads having generally convex sides and each side including a generated outer portion extending inward from the crest edge on the tip, a generated root portion extending outwardly from the root, and an intermediate band seal zone; and a gate rotor provided with a plurality of threads having generally concave sides and each side including a band seal zone extending inwardly from the tip crest edge, a generated root portion, and an intersection protuberance therebetween; the main rotor being characterized by having threads with troughs therebetween and the outer portions of the threads being generated by the protuberances on the gate rotor, the root portions being generated by the tip crest edges of the gate rotor and the band seal zones being formed to fit and operate congruently with the band seal zones on the gate rotor; the gate rotor being characterized by having threads with troughs therebetween and the root portions of the threads being generated by the crest edges of the main rotor threads and the band seal zones being formed to fit and operate congruently with the band seal zones on the main rotor threads to provide a relatively wide seal on the band seal zones and relatively narrow seals on the remainder of the threads.

12. Rotary means for use in a ported housing of a fluid pumping device comprising a rotor member rotatably positionable within said housing, said rotor member having equally spaced multiple helical threads, the sides of the threads being generally convex and there being cylindrical helical lands at the roots of the threads intersecting the convex sides of the threads at the roots of said threads and also helical lands forming the tips of the threads which provide a close running fit with the bore of the housing, said tip-forming lands having crest edges defining the intersections between the said lands and the convex sides of the threads, the rotor being characterized by having its threads cut away to form generally conical surfaces on one end of the threads, the cut away portions extending substantially from one end of the rotor and substantially at the greatest depth of the troughs at the roots of the threads and terminating at the tips of the threads intermediately of the ends of the rotor, the conical end of the rotor having a close running fit with a stationary complementary conical surface forming one end wall of the housing and completing the rotor seal.

References Cited in the file of this patent

UNITED STATES PATENTS

| | | |
|---|---|---|
| 395,956 | Day | Jan. 8, 1889 |
| 612,304 | Blazer | Oct. 11, 1898 |
| 630,648 | Brewer | Aug. 8, 1899 |
| 678,570 | Jones | July 16, 1901 |
| 1,991,541 | Cannizzaro | Feb. 19, 1935 |
| 2,079,083 | Montelius | May 4, 1937 |
| 2,369,539 | Delamere | Feb. 13, 1945 |
| 2,477,002 | Paget | July 26, 1949 |
| 2,652,192 | Chilton | Sept. 15, 1953 |

FOREIGN PATENTS

| | | |
|---|---|---|
| 469,405 | Italy | Mar. 1, 1952 |
| 588,287 | Great Britain | May 19, 1947 |
| 616,609 | Great Britain | Jan. 25, 1949 |

UNITED STATES PATENT OFFICE
CERTIFICATE OF CORRECTION

Patent No. 2,922,377                                                    January 26, 1960

Joseph E. Whitfield

It is hereby certified that error appears in the printed specification of the above numbered patent requiring correction and that the said Letters Patent should read as corrected below.

Column 6, line 8, strike out "sectional"; column 7, line 19, strike out "Referring to the drawings, the motor employed to il-"; column 11, line 20, for "cuter" read -- cutter --; column 12, line 72, for "justing" read -- just --; column 14, line 47, for "tremed" read -- termed --.

Signed and sealed this 31st day of May 1960.

(SEAL)
Attest:

KARL H. AXLINE                                                       ROBERT C. WATSON
Attesting Officer                                          Commissioner of Patents